US012810765B2

(12) United States Patent
Chun et al.

(10) Patent No.: US 12,810,765 B2
(45) Date of Patent: Nov. 24, 2026

(54) GATE DRIVER, DISPLAY DEVICE INCLUDING THE SAME AND ELECTRONIC DEVICE INCLUDING THE SAME

(71) Applicant: Samsung Display Co., LTD., Yongin-si (KR)

(72) Inventors: Jooyoung Chun, Yongin-si (KR); Nackhyeon Keum, Yongin-si (KR); Sanghun Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/272,010

(22) Filed: Jul. 17, 2025

(65) Prior Publication Data

US 2026/0065834 A1 Mar. 5, 2026

(30) Foreign Application Priority Data

Sep. 2, 2024 (KR) ........................ 10-2024-0118354

(51) Int. Cl.
*G09G 3/20* (2006.01)

(52) U.S. Cl.
CPC ... *G09G 3/2092* (2013.01); *G09G 2310/0267* (2013.01); *G09G 2310/0286* (2013.01); *G09G 2330/021* (2013.01)

(58) Field of Classification Search
CPC ............................................ G09G 2310/0286
See application file for complete search history.

(56) References Cited

U.S. PATENT DOCUMENTS

2009/0021502 A1* 1/2009 Lee ...................... G11C 19/184 345/55
2017/0154585 A1* 6/2017 Lee ...................... G09G 3/3677
2019/0027109 A1* 1/2019 Lee ...................... G09G 3/3677

FOREIGN PATENT DOCUMENTS

KR 102566221 B1 8/2023

* cited by examiner

*Primary Examiner* — Robin J Mishler
(74) *Attorney, Agent, or Firm* — CANTOR COLBURN LLP

(57) ABSTRACT

A display device includes a display panel including a plurality of pixels, a gate driver configured to output a gate signal to the pixels, a data driver configured to apply a data voltage to the pixels and a driving controller configured to control the gate driver and the data driver. The gate driver includes a first stage, a second stage and a clock signal compensator. The first stage generates a first gate signal based on a first clock signal and optionally a second clock signal. The clock signal compensator generates a compensation clock signal based on the first clock signal, the second clock signal and a clock control signal. The second stage generates a second gate signal based on the compensation clock signal and optionally the second clock signal.

20 Claims, 19 Drawing Sheets

GATE DRIVER, DISPLAY DEVICE INCLUDING THE SAME AND ELECTRONIC DEVICE INCLUDING THE SAME

This application claims priority to Korean Patent Application No. 10-2024-0118354, filed on Sep. 2, 2024, and all the benefits accruing therefrom under 35 U.S.C. § 119, the content of which in its entirety is herein incorporated by reference.

BACKGROUND

1. Field

Embodiments of the present invention relate to a display device. More particularly, embodiments of the present invention relate to a display device in which a power consumption is reduced.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver providing a gate signal to the gate lines, a data driver providing a data voltage to the data lines, an emission driver providing an emission signal to the emission lines and a driving controller controlling the gate driver, the data driver and the emission driver.

Generally, a gate signal is generated based on a clock signal.

SUMMARY

Embodiments of the present invention provide a gate driver reducing a power consumption.

Embodiments of the present invention also provide a display device in which a power consumption is reduced.

Embodiments of the present invention also provide an electronic in which a power consumption is reduced.

According to embodiments, a display device includes a display panel including a plurality of pixels, a gate driver configured to output a gate signal to the pixels, a data driver configured to apply a data voltage to the pixels and a driving controller configured to control the gate driver and the data driver. The gate driver includes a first stage, a second stage and a clock signal compensator. The first stage generates a first gate signal based on a first clock signal and optionally a second clock signal. The clock signal compensator generates a first compensation clock signal based on the first clock signal, the second clock signal and a clock control signal. The second stage generates a second gate signal based on the first compensation clock signal and optionally the second clock signal.

In an embodiment, the clock signal compensator may include a first transistor configured to apply the first clock signal to a first node in response to the clock control signal, a second transistor configured to connect the first node and a second node, a third transistor configured to apply a high power voltage to a third node in response to the second clock signal and a fourth transistor configured to apply a low power voltage lower than the high power voltage to the third node in response to a voltage of the second node. The third node may output the first compensation clock signal.

In an embodiment, the first transistor may be an N-type transistor, and the second transistor, the third transistor and the fourth transistor may be P-type transistors.

In an embodiment, when the clock control signal has an inactivation level, the first transistor may be turned off, and the first compensation clock signal may maintain as a clock high level.

In an embodiment, the first transistor may include a control electrode, which receives the clock control signal, a first electrode, which receives the first clock signal and a second electrode connected to the first node. The second transistor may include a control electrode, which receives the low power voltage, a first electrode connected to the first node and a second electrode connected to the second node. The third transistor may include a control electrode, which receives the second clock signal, a first electrode, which receives the high power voltage and a second electrode connected to the third node. The fourth transistor may include a control electrode connected to the second node, a first electrode, which receives the low power voltage and a second electrode connected to the third node.

In an embodiment, the clock control signal may include an enable signal and an inverted enable signal which has inverted phase from the enable signal. The clock signal compensator may include a first transistor configured to apply the first clock signal to a first node in response to the inverted enable signal, a second transistor configured to connect the first node and a second node, a third transistor configured to apply a low power voltage to a third node in response to a voltage of the second node, a fourth transistor configured to apply the second clock signal to a fourth node in response to the inverted enable signal, a fifth transistor configured to apply a high power voltage higher than the low power voltage to the third node in response to a voltage of the fourth node and a sixth transistor configured to apply the high power voltage to the third node in response to the enable signal. The third node may output the first compensation clock signal.

In an embodiment, when the enable signal has an activation level, the sixth transistor may be turned on, and the first compensation clock signal may maintain as a clock high level.

In an embodiment, when the enable signal has an activation level, the first transistor may be turned off.

In an embodiment, wherein the first transistor may include a control electrode, which receives the inverted enable signal, a first electrode, which receives the first clock signal and a second electrode connected to the first node. The second transistor may include a control electrode, which receives the low power voltage, a first electrode connected to the first node and a second electrode connected to the second node. The third transistor may include a control electrode connected to the second node, a first electrode, which receives the low power voltage and a second electrode connected to the third node. The fourth transistor may include a control electrode, which receives the inverted enable signal, a first electrode, which receives the second clock signal and a second electrode connected to the fourth node. The fifth transistor may include a control electrode connected to a fourth node, a first electrode, which receives the high power voltage and a second electrode connected to the third node. The sixth transistor may include a control electrode, which receives the enable signal, a first electrode, which receives the high power voltage and a second electrode connected to the third node.

In an embodiment, the clock control signal may include an enable signal. The clock signal compensator may include a first transistor configured to apply the first clock signal to a first node in response to the enable signal, a second transistor configured to connect the first node and a second node, a third transistor configured to apply a low power voltage to a third node in response to a voltage of the second node, a fourth transistor configured to apply the second clock signal to a fourth node in response to the enable signal, a fifth transistor configured to apply a high power voltage higher than the low power voltage to a third node in response to a voltage of the fourth node and a sixth transistor configured to apply the high power voltage to the third node in response to the enable signal. The third node may output the first compensation clock signal.

In an embodiment, the first transistor and the fourth transistor may be N-type transistors. The second transistor, the third transistor, the fifth transistor and the sixth transistor may be P-type transistors.

In an embodiment, when the enable signal has a logic high level, the first transistor may be turned on, the fourth transistor may be turned on, and the sixth transistor may be turned off.

In an embodiment, when the enable signal has a logic low level, the first transistor may be turned off, the fourth transistor may be turned off, and the sixth transistor may be turned on.

In an embodiment, when the enable signal has a logic low level, the first compensation clock signal may have a clock high level.

In an embodiment, wherein the clock signal compensator may include a first transistor configured to apply the first clock signal to a first node in response to the clock control signal, a second transistor configured to connect the first node and a second node, a third transistor configured to apply a high power voltage to a third node in response to a voltage of the second node and a fourth transistor configured to apply a low power voltage lower than the high power voltage to the third node in response to the second clock signal. The third node may output the first compensation clock signal.

In an embodiment, when the clock control signal has an inactivation level, the first compensation clock signal may have a clock low level.

In an embodiment, when the clock control signal has an inactivation level, the first compensation clock signal may have a DC voltage.

According to embodiments, a gate driver includes a first stage configured to generate a first gate signal based on a first clock signal and optionally a second clock signal, a clock signal compensator configured to generate a first compensation clock signal based on the first clock signal, the second clock signal and a clock control signal and a second stage configured to generate a second gate signal based on the first compensation clock signal and optionally the second clock signal.

In an embodiment, the clock signal compensator may include a first transistor configured to apply the first clock signal to a first node in response to the clock control signal, a second transistor configured to connect the first node and a second node, a third transistor configured to apply a high power voltage to a third node in response to the second clock signal and a fourth transistor configured to apply a low power voltage lower than the high power voltage to the third node in response to a voltage of the second node. The third node may output the first compensation clock signal.

In an embodiment, the clock control signal may include an enable signal and an inverted enable signal which has inverted phase from the enable signal. The clock signal compensator may include a first transistor configured to apply the first clock signal to a first node in response to the inverted enable signal, a second transistor configured to connect the first node and a second node, a third transistor configured to apply a low power voltage to a third node in response to a voltage of the second node, a fourth transistor configured to apply the second clock signal to a fourth node in response to the inverted enable signal, a fifth transistor configured to apply a high power voltage higher than the low power voltage to the third node in response to a voltage of the fourth node and a sixth transistor configured to apply the high power voltage to the third node in response to the enable signal. The third node may output the first compensation clock signal.

According to embodiments, an electronic device includes a display panel including a plurality of pixels, a gate driver configured to output a gate signal to the pixels, a data driver configured to apply a data voltage to the pixels, a driving controller configured to control the gate driver and the data driver based on an input control signal and a processor configured to output the input control signal. The gate driver includes a first stage, a second stage and a clock signal compensator. The first stage generates a first gate signal based on a first clock signal and optionally a second clock signal. The clock signal compensator generates a first compensation clock signal based on the first clock signal, the second clock signal and a clock control signal. The second stage generates a second gate signal based on the first compensation clock signal and optionally the second clock signal.

As described above, a compensation clock signal may have DC voltage based on a clock control signal. Accordingly, stages (e.g., compensation stages) included in a gate driver applied to the compensation clock signal may receive the compensation clock signal having DC voltage. Accordingly, a power consumption of the display device may be effectively reduced. Additionally, the compensation stages may be initialized as the DC voltage. Accordingly, a driving reliability of the gate driver may be improved. For example, the compensation stages may not generate the gate signals. The compensation stages may not generate the gate signals, so that a power consumption of the display device may be further reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Hereinafter, the present invention will be explained in detail with reference to the accompanying drawings.

Figure 1:
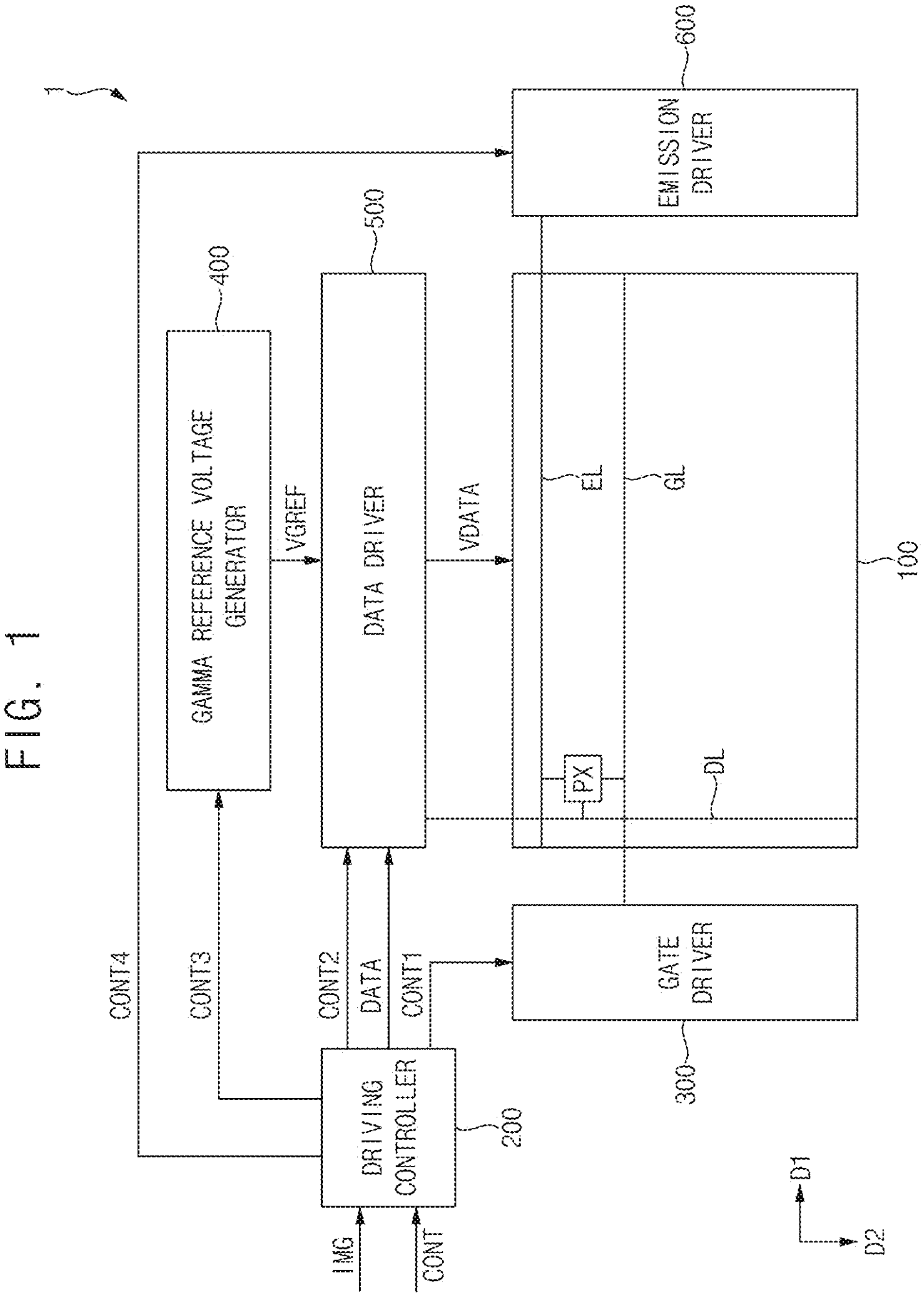
FIG. 1 is a block diagram illustrating a display device according to embodiments of the present invention.

FIG. 1 is a block diagram illustrating a display device 1 according to embodiments of the present invention.

Referring to FIG. 1, the display device 1 may include a display panel 100 and a display panel driver. The display panel driver 110 may include a driving controller 200, a gate driver 300, a gamma reference voltage generator 400, a data driver 500 and an emission driver 600.

The display panel 100 may have a display region on which an image is displayed and a peripheral region adjacent to the display region.

The display panel 100 may include a plurality of gate lines GL, plurality of emission lines EL, a plurality of data lines DL and a plurality of pixels PX electrically connected to the gate lines GL, the emission lines EL and the data lines DL. The gate lines GL may extend in a first direction D1 and the data lines DL may extend in a second direction D2 crossing the first direction D1. The emission lines EL may extend in the first direction D1.

Figure 19:
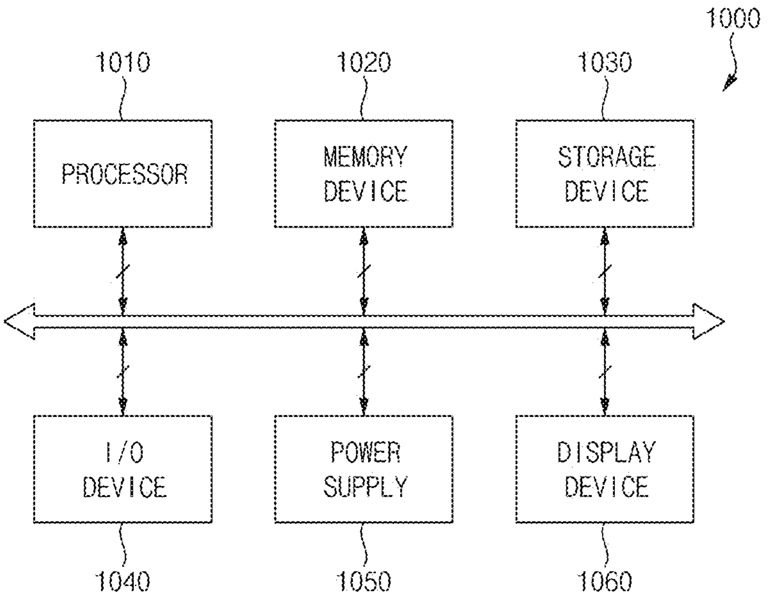
FIG. 19 is a block diagram illustrating an electronic apparatus according to an embodiment of the present invention.

The driving controller 200 may receive input image data IMG and an input control signal CONT from an external apparatus (e.g., a processor 1010 in FIG. 19). For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals driving the gate lines GL in response to the first control signal CONT1 received from the driving controller 200. The gate driver 300 may output the gate signals to the gate lines GL.

In an embodiment, the gate driver 300 may be disposed in the peripheral region. In an embodiment, the gate driver 300 may be integrated in the peripheral region.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages VDATA having an analog type using the gamma reference voltages VGREF. The data driver 500 outputs the data voltages VDATA to the data lines DL.

In an embodiment, the data driver 500 may be disposed in the peripheral region. In an embodiment, the data driver 500 may be integrated in the peripheral region.

The emission driver 600 may generate emission signal in response to the fourth control signal CONT4 received from the driving controller 200. The emission driver 600 may output the emission signal to the display panel 100.

In an embodiment, the emission driver 600 may be disposed in the peripheral region. In an embodiment, the emission driver 600 may be integrated in the peripheral region.

Although the gate driver 300 is disposed on a first side of the display panel 100, and the emission driver 600 is disposed on a second side of the display panel 100 in FIG. 1 for convenience of explanation, the present invention is not limited thereto. The gate driver 300 and the emission driver 600 may be disposed on the first side of the display panel 100. For example, the gate driver 300 and the emission driver 600 may be disposed on the peripheral region of the display panel 100 on the same side of the display region of the display panel 100. For example, the gate driver 300 and the emission driver 600 may be formed integrally with each other.

Figure 2:
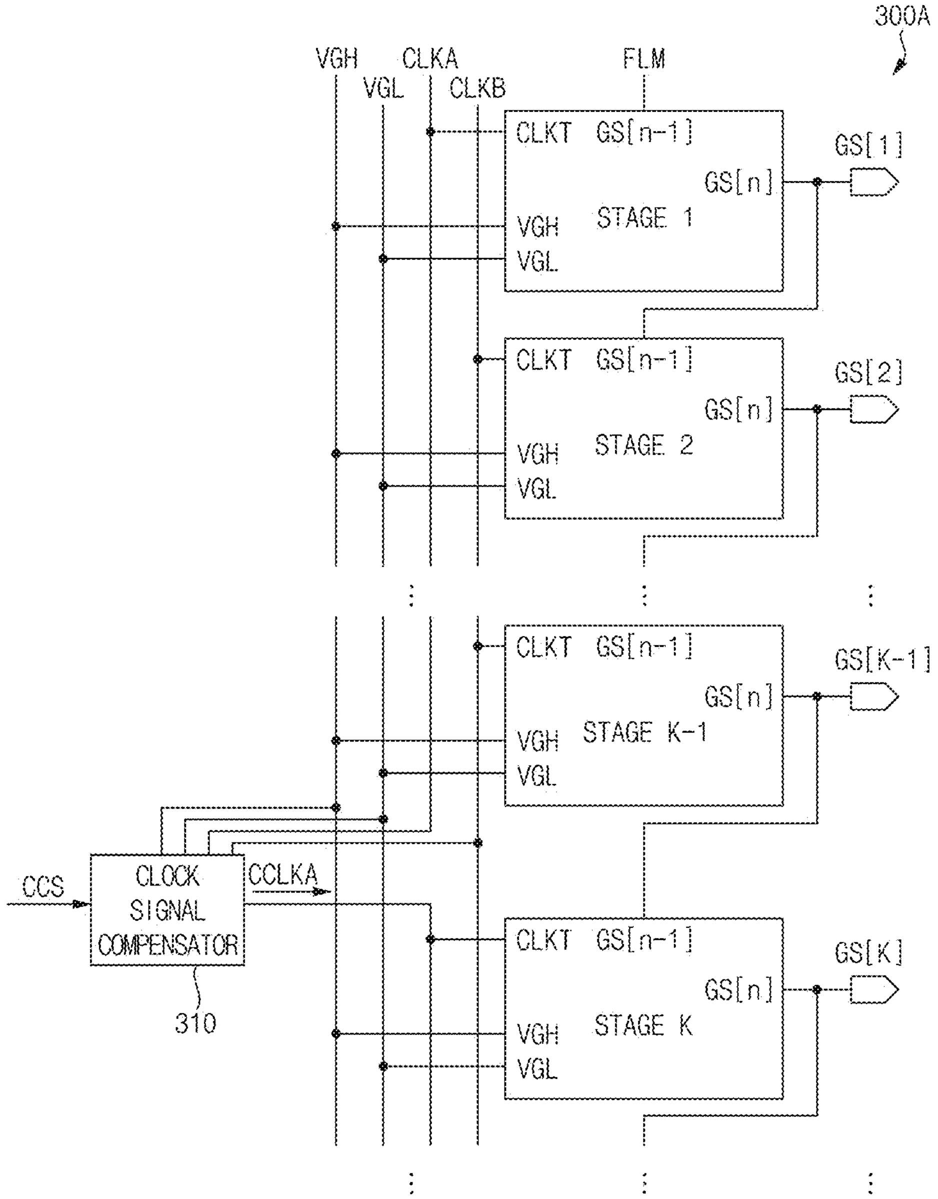
FIG. 2 is a block diagram illustrating an example of a gate driver of FIG. 1.

FIG. 2 is a block diagram illustrating an example of a gate driver 300 of FIG. 1.

Referring to FIG. 1 and FIG. 2, a gate driver 300A may include a plurality of stages STAGE1, STAGE2 to STAGE K-1, STAGE K, . . . which receive a vertical start signal FLM, a first gate clock signal CLKA and a second clock signal CLKB, and sequentially output the gate signals GS[1], GS[2], to GS[K-1], GS[K], . . . to a plurality of pixels PX row-by-row. That is, the first gate signal GS[1] is provided to pixels in a first row, the second gate signal GS[2] is provided to pixels in a second row . . . and the K-th gate signal GS[K] is provided to pixels in a K-th row.

In the present embodiment, the gate driver 300A may further include a clock signal compensator 310. The clock signal compensator 310 may receive a clock control signal CCS, a high power voltage VGH, a low power voltage VGL, the first clock signal CLKA and the second clock signal CLKB. The clock signal compensator 310 may generate a first compensation clock signal CCLKA based on the clock control signal CCS, the first clock signal CLKA and the second clock control signal CLKB. The clock signal compensator 310 may output the first compensation clock signal CCLKA to the K-th stage STAGE K.

The first clock signal CLKA may be applied to a clock terminal CLKT of the first stage STAGE 1. The second clock signal CLKB may be applied to a clock terminal CLKT of the second stage STAGE 2. The second clock signal CLKB may be applied to a clock terminal CLKT of the K−1-th stage STAGE K−1. The first clock signal CLKA may be applied to a clock terminal CLKT of the K-th stage STAGE K.

In the present embodiment, the K-th stage may receive the first compensation clock signal CCLK rather than the first clock signal CLKA.

In a conventional gate driver, a reliability of a clock signal may be reduced by the length of a clock line to which the clock signal is applied. For example, the reliability of the waveform of the clock signal may be reduced by resistance, capacitance, etc. according to the length of the clock line. Accordingly, the reliability of a gate signal may be reduced.

In contrast, in the present embodiment, the K-th stage STAGE K may receive the first compensation clock signal CCLK rather than the first clock signal CLKA, so that a reliability of a clock signal applied to the K-th stage STAGE K may be improved. For example, the first stage STAGE 1 may generate a first gate signal GS[1] based on the first clock signal CLKA. The K-th stage STAGE K may generate a K-th gate signal GS[K] based on the first compensation clock signal CCLKA. An output characteristics (e.g., rising characteristics, falling characteristics, delay characteristics, etc.) of the K-th gate signal GS[K] may be substantially the same as an output characteristics of the first gate signal GS[1]. Accordingly, an output reliability and an output stability of the gate signals outputted from the gate driver 300A may be improved. Accordingly, a display quality of the display panel 100 may be effectively improved.

Figure 3:
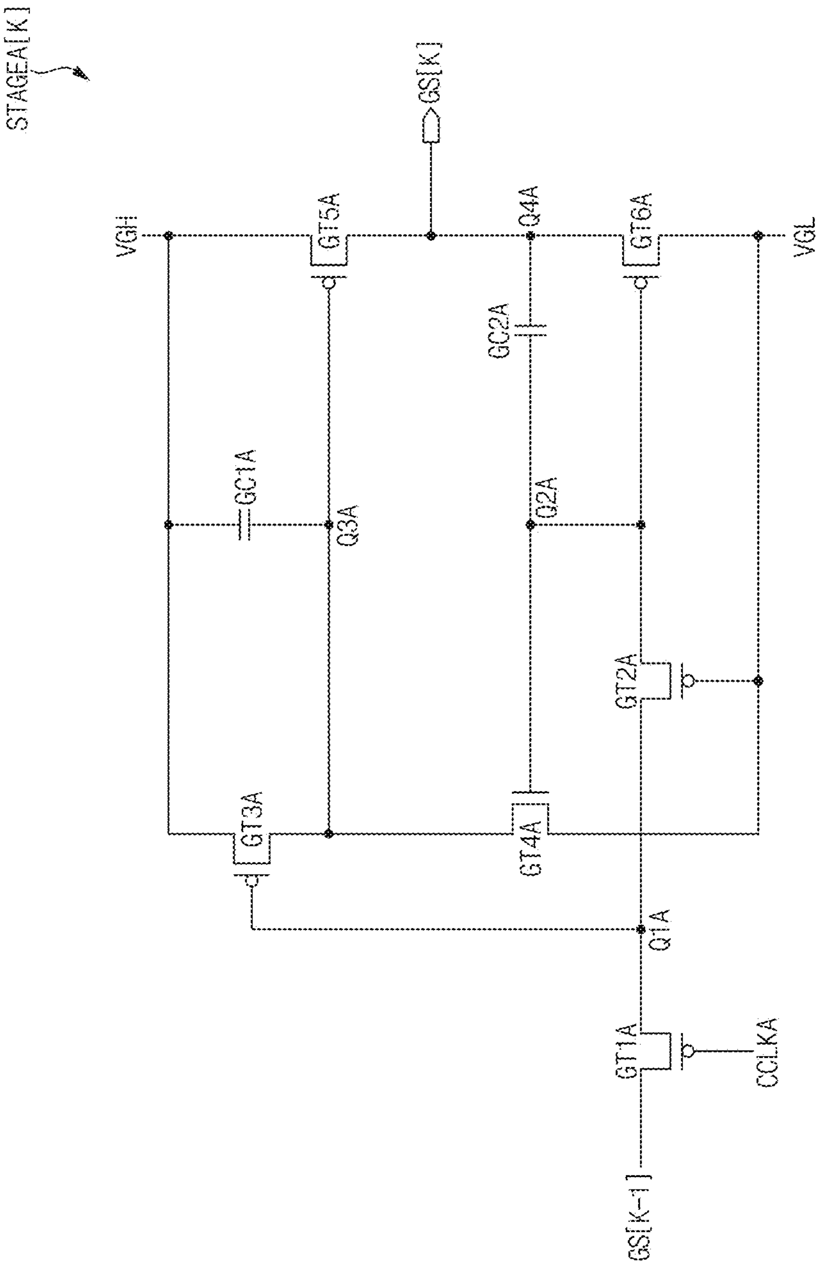
FIG. 3 is a block diagram illustrating an example of a K-th stage included in a gate driver of FIG. 2.

FIG. 3 is a block diagram illustrating an example of a K-th stage STAGE K included in a gate driver 300A of FIG. 2.

Referring to FIG. 1 to FIG. 3, a K-th stage STAGEA[K] may include first to sixth gate transistors GT1A, GT2A, GT3A, GT4A, GT5A and GT6A, a first gate capacitor GC1A and a second gate capacitor GC2A.

The first gate transistor GT1A may include a control electrode for receiving the first compensation clock signal CCLKA, a first electrode for receiving a previous gate signal GS[K−1] and a second electrode connected to a first gate node Q1A. The first gate transistor GT1A may apply the previous gate signal GS[K−1] to the first gate node Q1A in response to the first compensation clock signal CCLKA.

The second gate transistor GT2A may include a control electrode for receiving a low power voltage VGL, a first electrode connected to the first gate node Q1A and a second electrode connected to a second gate node Q2A. The second gate transistor GT2A may connect the first gate node Q1A and the second gate node Q2A.

The third gate transistor GT3A may include a control electrode connected to the first gate node Q1A, a first electrode for receiving a high power voltage VGH and a second electrode connected to a third gate node Q3A. The third gate transistor GT3A may apply the high power voltage VGH to the third gate node Q3A in response to a voltage of the first gate node Q1A. The high power voltage VGH may be higher than the low power voltage VGL.

The fourth gate transistor GT4A may include a control electrode connected to the second gate node Q2A, a first electrode for receiving the low power voltage VGL and a second electrode connected to the third gate node Q3A. The fourth gate transistor GT4A may apply the low power voltage VGL to the third gate node Q3A in response to a voltage of the second gate node Q2A.

The fifth gate transistor GT5A may include a control electrode connected to the third gate node Q3A, a first electrode for receiving the high power voltage VGH and a second electrode connected to the fourth gate node Q4A. The fifth gate transistor GT5A may apply the high power voltage VGH to the fourth gate node Q4A in response to a voltage of the third gate node Q3A.

The sixth gate transistor GT6A may include a control electrode connected to the second gate node Q2A, a first electrode for receiving the low power voltage VGL and a second electrode connected to the fourth gate node Q4A. The sixth gate transistor GT6A may apply the low power voltage VGL to the fourth gate node Q4A in response to a voltage of the second gate node Q2A.

The first gate capacitor GCIA may include a first electrode for receiving the high power voltage VGH and a second electrode connected to the third gate node Q3A. The second gate capacitor GC2A may include a first electrode connected to the second gate node Q2A and a second electrode connected to the fourth gate node Q4A.

The K-th stage STAGEA[K] may output the K-th gate signal GS[K] based on the high power voltage VGH, the low power voltage VGL, the previous gate signal GS[K−1] and the first compensation clock signal CCLKA. However, the present invention is not limited to a structure of the K-th stage STAGEA[K].

Figure 4:
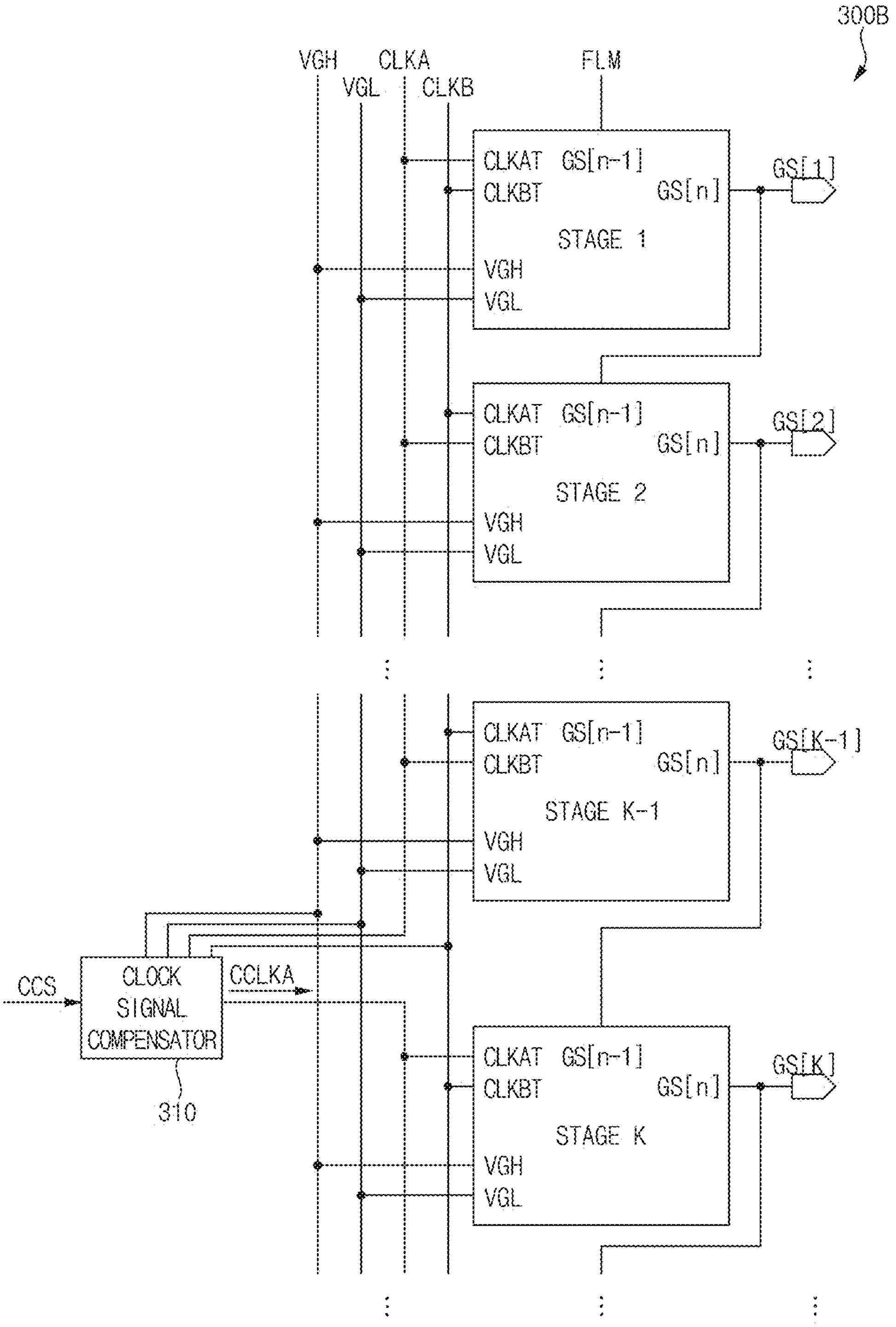
FIG. 4 is a block diagram illustrating another example of a gate driver of FIG. 1.

FIG. 4 is a block diagram illustrating another example of a gate driver 300 of FIG. 1.

Referring to FIG. 1 and FIG. 4, a gate driver 300B may include a plurality of stages STAGE1, STAGE2 to STAGE K−1, STAGE K, . . . which receive a vertical start signal FLM, a first gate clock signal CLKA and a second clock signal CLKB, and sequentially output the gate signals GS[1], GS[2], to GS[K−1], GS[K], . . . to a plurality of pixels PX row-by-row. That is, the first gate signal GS[1] is provided to pixels in a first row, the second gate signal GS[2] is provided to pixels in a second row . . . and the K-th gate signal GS[K] is provided to pixels in a K-th row.

In the present embodiment, the gate driver 300B may include a clock signal compensator 310. The clock signal compensator 310 may receive a clock control signal CCS, a high power voltage VGH, a low power voltage VGL, the first clock signal CLKA and the second clock signal CLKB. The clock signal compensator 310 may generate a first compensation clock signal CCLKA based on the clock control signal CCS, the first clock signal CLKA and the second clock control signal CLKB. The clock signal compensator 310 may output the first compensation clock signal CCLKA to the K-th stage STAGE K.

The first clock signal CLKA may be applied to a first clock terminal CLKAT of the first stage STAGE 1, and the second clock signal CLKB may be applied to a second clock terminal CLKBT of the first stage STAGE 1. The second clock signal CLKB may be applied to a second clock terminal CLKBT of the second stage STAGE 2, and the first clock signal CLKA may be applied to a first clock terminal CLKAT of the second stage STAGE 2. Like this way, both the first clock signal CLKA and the second clock signal CLKB are supplied to each of the first to K−1-th stages STAGE 1 to STAGE K−1.

In the present embodiment, the K-th stage may receive the first compensation clock signal CCLK rather than the first clock signal CLKA.

In a conventional gate driver, a reliability of a clock signal may be reduced by the length of a clock line to which the clock signal is applied. For example, the reliability of the waveform of the clock signal may be reduced by resistance, capacitance, etc. according to the length of the clock line. Accordingly, the reliability of a gate signal may be reduced.

In contrast, in the present embodiment, the K-th stage STAGE K may receive the first compensation clock signal CCLK rather than the first clock signal CLKA. The K-th stage STAGE K may receive the first compensation clock signal CCLK rather than the first clock signal CLKA, so that a reliability of a clock signal applied to the K-th stage STAGE K may be improved. For example, the first stage STAGE 1 may generate a first gate signal GS[1] based on the first clock signal CLKA and the second clock signal CLKB. The K-th stage STAGE K may generate a K-th gate signal based on the first compensation clock signal CCLKA and the second clock signal CLKB. An output characteristics (e.g., rising characteristics, falling characteristics, delay characteristics, etc.) of the K-th gate signal GS[K] may be substantially the same as an output characteristics of the first gate signal GS[1]. Accordingly, an output reliability and an output stability of the gate signals outputted from the gate driver 300A may be improved. Accordingly, a display quality of the display panel 100 may be effectively improved.

Figure 5:
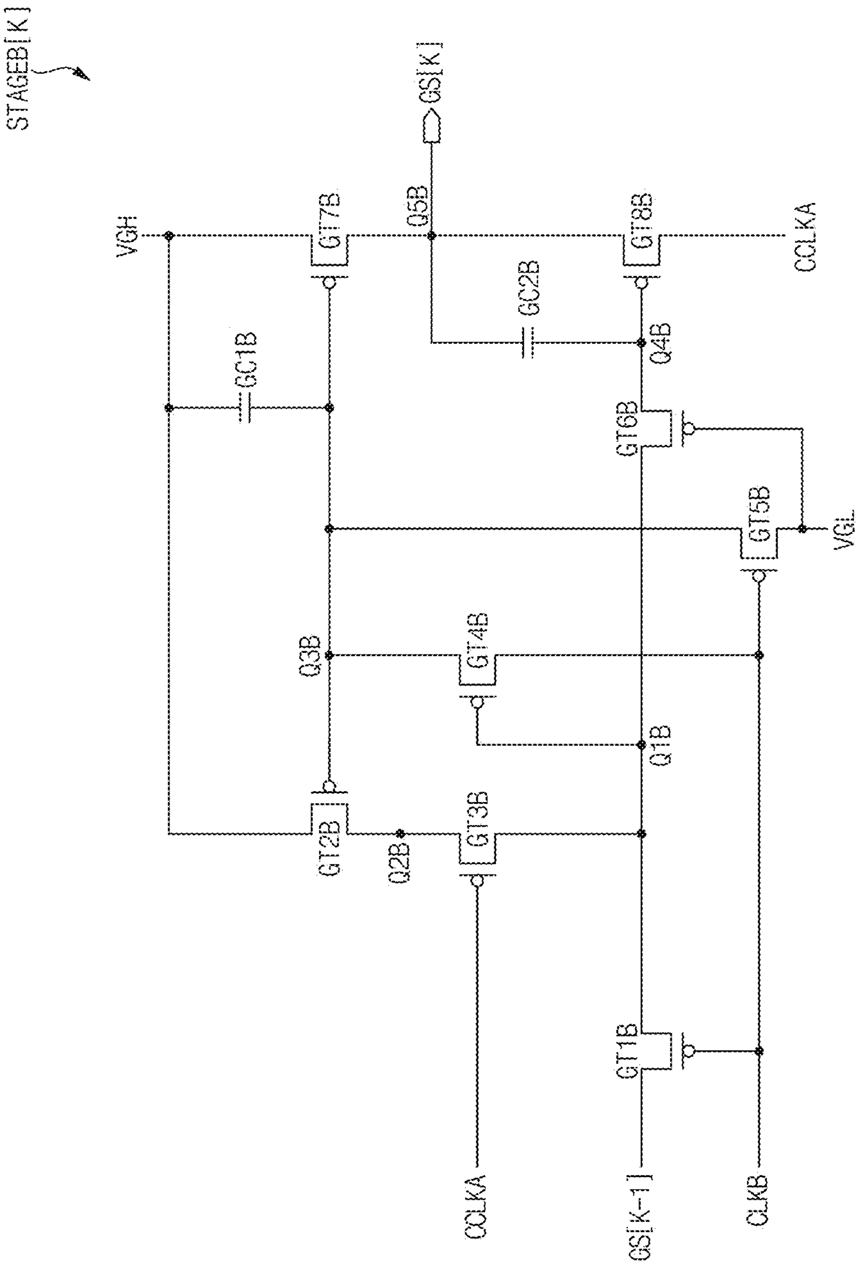
FIG. 5 is a block diagram illustrating an example of a K-th stage included in a gate driver of FIG. 4.

FIG. 5 is a block diagram illustrating an example of a K-th stage STAGEB [K] included in a gate driver of FIG. 4.

Referring to FIG. 1, FIG. 4 and FIG. 5, a K-th stage STAGEA[K] may include first to eighth gate transistors GT1B, GT2B, GT3B, GT4B, GT5B, GT6B, GT7B and GT8B, a first gate capacitor GC1B and a second gate capacitor GC2B.

The first gate transistor GT1B may include a control electrode for receiving the second clock signal CLKB, a first electrode for receiving a previous gate signal GS[K−1] and a second electrode connected to a first gate node Q1B. The first gate transistor GT1A may apply the previous gate signal GS[K−1] to the first gate node Q1B in response to the second clock signal CLKB.

The second gate transistor GT2B may include a control electrode connected to a third gate node Q3B, a first electrode for receiving the high power voltage VGH and a second electrode connected to a second gate node Q2B. The second gate transistor GT2B may apply the high power voltage VGH to the second gate node Q2B in response to a voltage of the third gate node Q3B.

The third gate transistor GT3B may include a control electrode for receiving the first compensation clock signal CCLKA, a first electrode connected to the second gate node Q2B and a second electrode connected to the first gate node Q1B. The third gate transistor GT3B may connect the second gate node Q2B and the first gate node Q1B in response to the first compensation clock signal CCLKA.

The fourth gate transistor GT4B may include a control electrode connected to the first gate node Q1B, a first electrode for receiving the second clock signal CLKB and a second electrode connected to the third gate node Q3B. The third gate transistor GT3A may apply the second clock signal CLKB to the third gate node Q3B in response to a voltage of the first gate node Q1B.

The fifth gate transistor GT5B may include a control electrode for receiving the second lock signal CLKB, a first electrode for receiving the low power voltage VGL and a second electrode connected to the third gate node Q3B. The fifth gate transistor GT5B may apply the low power voltage VGL to the third gate node Q3A in response to the second clock signal CLKB.

The sixth gate transistor GT6B may include a control electrode for receiving the low power voltage VGL, a first electrode connected to the first gate node Q1B and a second electrode connected to the fourth gate node Q4B. The sixth gate transistor GT6B may connect the first gate node Q1B and the fourth gate node Q4B.

The seventh gate transistor GT7B may include a control electrode connected to the third gate node Q3B, a first electrode for receiving the high power voltage VGH and a second electrode connected to a fifth gate node Q5B. The seventh gate transistor GT7B may apply the high power voltage VGH to the fifth gate node Q5B in response to a voltage of the third gate node Q3B.

The eighth gate transistor GT8B may include a control electrode connected to the fourth gate node Q4B, a first electrode for receiving the first compensation clock signal CCLKA and a second electrode connected to the fifth gate node Q5B. The eighth gate transistor GT8B may apply the first compensation clock signal CCLKA to the fifth gate node Q5B in response to a voltage of the fourth gate node Q4B.

The first gate capacitor GC1B may include a first electrode for receiving the high power voltage VGH and a second electrode connected to the third gate node Q3B. The second gate capacitor GC2B may include a first electrode connected to the fourth gate node Q4B and a second electrode connected to the fifth gate node Q5B.

The K-th stage STAGEA[K] may output the K-th gate signal GS[K] based on the high power voltage VGH, the low power voltage VGL, the previous gate signal GS[K−1] and the first compensation clock signal CCLKA. However, the present invention is not limited to a structure of the K-th stage STAGEA[K].

Figure 6:
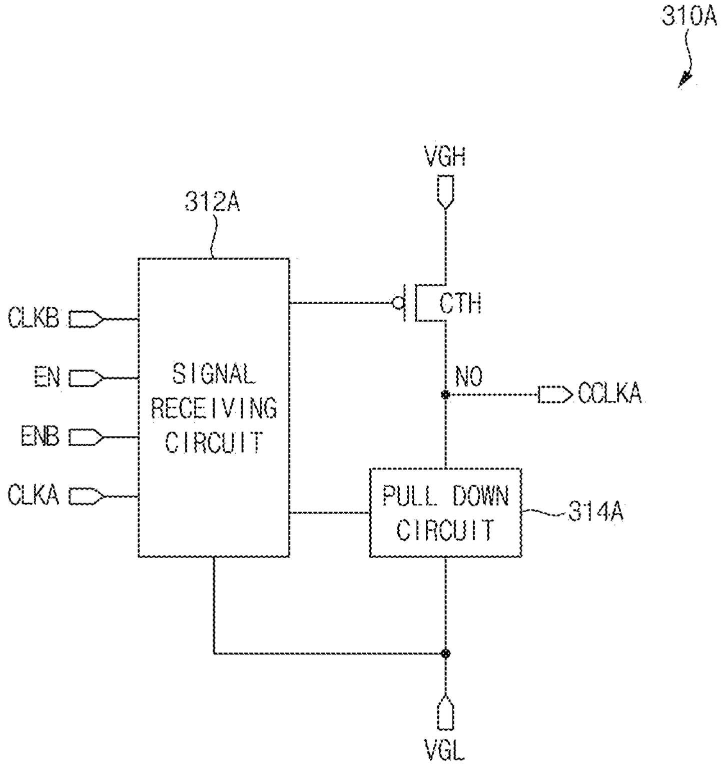
FIG. 6 is a circuit diagram illustrating an example of a clock signal compensator included in a gate driver of FIG. 1.
Figure 7:
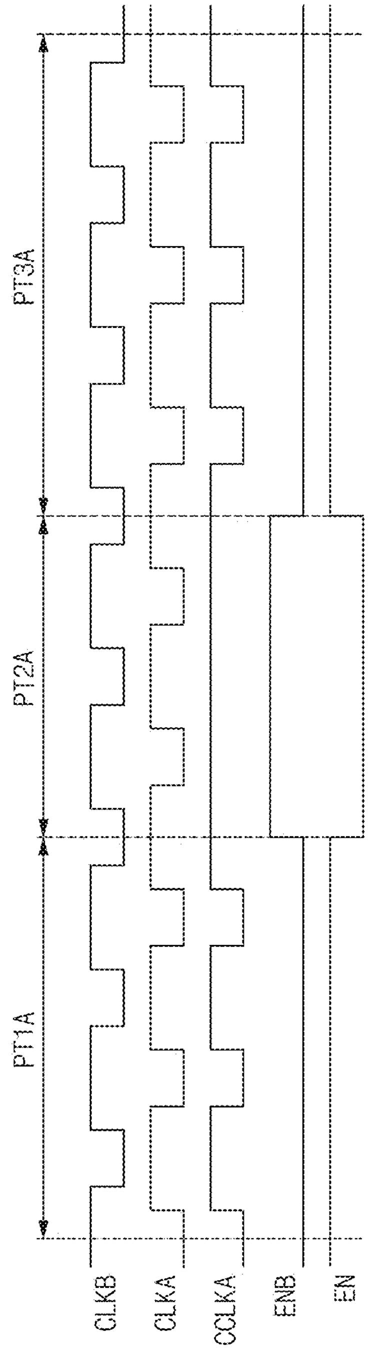
FIG. 7 is a timing diagram illustrating an example of input signals and an output signal of a clock signal compensator of FIG. 6.

FIG. 6 is a circuit diagram illustrating an example of a clock signal compensator 310 included in a gate driver 300 of FIG. 1. FIG. 7 is a timing diagram illustrating an example of input signals and an output signal of a clock signal compensator 310A of FIG. 6.

Referring to FIG. 1 to FIG. 7, the clock signal compensator 310A may include a signal receiving circuit 312A, a pull down circuit 314A and a pull up transistor CTH. The clock control signal CCS may include an enable signal EN and an inverted enable signal ENB. A phase of the inverted enable signal ENB may have an inverted phase from the enable signal EN. For example, when the inverted enable signal ENB has a logic high level, the enable signal EN may have a logic low level. For example, when the inverted enable signal ENB has a logic low level, the enable signal EN may have a logic high level. Herein, “a signal has an activation level” means when the signal is supplied to a control electrode of a transistor, the transistor is turned on, and “a signal has an inactivation level” means when the signal is supplied to a control electrode of a transistor, the transistor is turned off. For an example, when a transistor is a P-type transistor, the activation level may be a logic low level, and the inactivation level may be a logic high level. Additionally, when a transistor is an N-type transistor, the activation level may be a logic high level, and the inactivation level may be a logic low level.

The signal receiving circuit 312A may receive the first clock signal CLKA, the second clock signal CLKB, the enable signal EN and the inverted enable signal ENB. The signal receiving circuit 312A may generate a pull up control signal and a pull down control signal based on the first clock signal CLKA, the second clock signal CLKB, the enable signal EN and the inverted enable signal ENB. The signal receiving circuit 312A may output the pull up control signal to the pull up transistor CTH. The signal receiving circuit 312A may output the pull down control signal to the pull down circuit 314A. The first clock signal CLKA and the second clock signal CLKB may have the same signal pattern but different phases. For example, the phase of the second clock signal CLKB may be delayed a half cycle from the phase of the first clock signal CLKA.

The pull up transistor CTH may output the high power voltage VGH to an output node NO in response to the pull up control signal. The pull down circuit 314A may output the low power voltage VGL to the output node NO in response to the pull down control signal. The output node NO may output the first compensation clock signal CCLKA.

In the present embodiment, a period in which the clock signals CLKA, CLKB and CCLKA are outputted may include a first period PT1A, a second period PT2A and a third period PT3A.

In the first period PT1A, the enable signal EN may have a logic high level, and the inverted enable signal ENB may have a logic low level. In the first period PT1A, the first compensation clock signal CCLKA may have substantially same timing with the first clock signal CLKA.

In the second period PT2A following to the first period PT1A, the enable signal EN may have a logic low level, and the inverted enable signal ENB may have a logic high level.

In the second period PT2A, the first compensation clock signal CCLKA may have DC voltage based on the clock control signal CCS. For example, when the enable signal EN may have a logic low level, and the inverted enable signal ENB may have a logic high level, the first compensation clock signal CCLKA may have DC voltage. For example, in the second period PT2A, the first compensation clock signal CCLKA may be maintained as a clock high level.

In the present embodiment, the first compensation clock signal CCLKA may have DC voltage based on the clock control signal CCS, the compensation stages (e.g., stages after the K−1-th stage) may receive the first compensation clock signal CCLKA having DC voltage. Accordingly, a power consumption of the display device 1 may be reduced. Additionally, the compensation stages (e.g., STAGE K and after) may be initialized as the DC voltage. Accordingly, a driving reliability of the gate driver 300 may be effectively improved. For example, the compensation stages may not generate the gate signals. The compensation stages may not generate the gate signals, so that a power consumption of the display device 1 may be further reduced.

The third period PT3A following to the second period PT2A, the enable signal EN may have a logic high level, and the inverted enable signal ENB may have a logic low level. In the third period PT3A, the first compensation clock signal CCLKA may have substantially same timing with the first clock signal CLKA.

Figure 8:
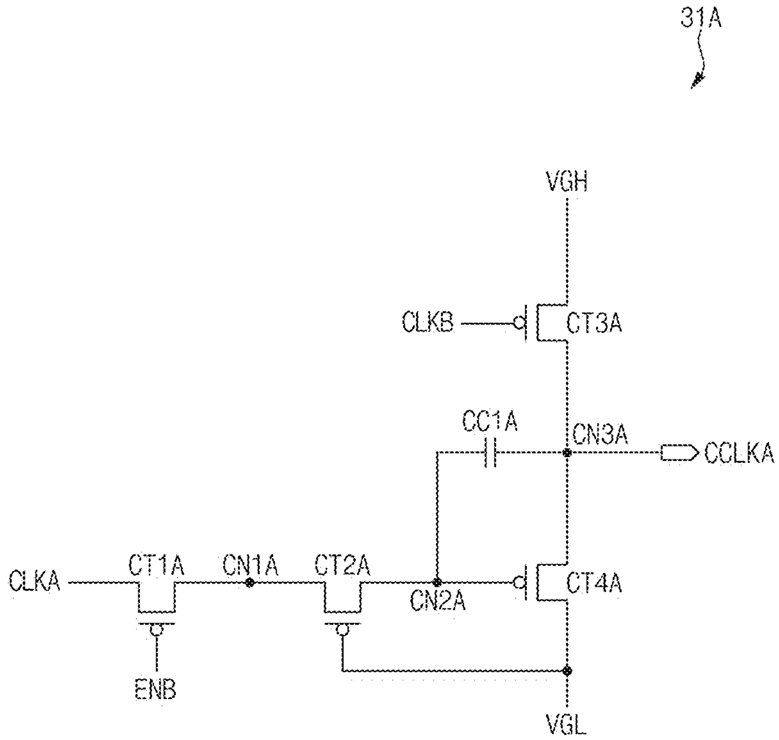
FIG. 8 is a circuit diagram illustrating an example of a clock signal compensator of FIG. 6.

FIG. 8 is a circuit diagram illustrating an example of a clock signal compensator 310A of FIG. 6.

Referring to FIG. 1 to FIG. 8, the clock signal compensator 31A may include first to fourth transistors CT1A, CT2A, CT3A and CT4A and a first capacitor CC1A.

The first transistor CT1A may include a control electrode for receiving the inverted enable signal ENB, a first electrode for receiving the first clock signal CLKA and a second electrode connected to a first node CN1A. The first transistor CT1A may apply the first clock signal CLKA to the first node CN1A in response to the inverted enable signal ENB.

The second transistor CT2A may include a control electrode for receiving the low power voltage VGL, a first electrode connected to the first node CN1A and a second electrode connected to the second node CN2A. The second transistor CT2A may connect the first node CN1A and the second node CN2A.

The third transistor CT3A may include a control electrode for receiving the second clock signal CLKB, a first electrode for receiving the high power voltage VGH and a second electrode connected to the third node CN3A. The third transistor CT3A may apply the high power voltage VGH to the third node CN3A in response to the second clock signal CLKB. The fourth transistor CT4A may include a control electrode connected to the second node CN2A, a first electrode for receiving the low power voltage VGL and a second electrode connected to the third node CN3A. The fourth transistor CT4A may apply the low power voltage VGL to the third node CN3A in response to a voltage of the second node CN2A.

The first capacitor CC1A may include a first electrode connected to the second node CN2A and a second electrode connected to the third node CN3A.

In the present embodiment, the clock signal compensator 31A may output the first compensation clock signal CCLKA. The third node CN3A of the clock signal compensator 31A may output the first compensation clock signal CCLKA.

In the first period PT1A, the inverted enable signal ENB may have the logic low level, so that the first transistor CT1A may be turned on. Accordingly, the first clock signal CLKA may be applied to the first node CN1A. The first clock signal CLKA may be applied to the first node CN1A, so that the first compensation clock signal CCLKA may have substantially same timing with the first clock signal CLKA.

In the second period PT2A, the inverted enable signal ENB may have the logic high level, so that the first transistor CT1A may be turned off. Accordingly, the first clock signal CLKA may not be applied to the first node CN1A. In the second period PT2A, the first clock signal CLKA may not be applied to the first node CN1A, so that the first compensation clock signal CCLKA may have a clock high level. For example, the first compensation clock signal CCLKA may be maintained as clock high level.

In the present embodiment, the first compensation clock signal CCLKA may be outputted based on the inverted enable signal ENB. Additionally, some stages of the gate driver 3000 may receive the first compensation clock signal CCLK, so that the first compensation clock signal CCLKA may have substantially same timing with the first clock signal CLKA. Accordingly, timings applied to the clock signals applied to stages of the gate driver 300 may be substantially same. The timings applied to the clock signals applied to stages of the gate driver 300 may be substantially same, so that the gate signals generated from the gate driver 300 may be improved. Accordingly, a display quality of the display panel 100 may be effectively improved.

Additionally, the first compensation clock signal CCLKA may keep the clock high level based on the inverted enable signal ENB. Accordingly, a power consumption of the display device 1 may be effectively reduced.

Figure 9:
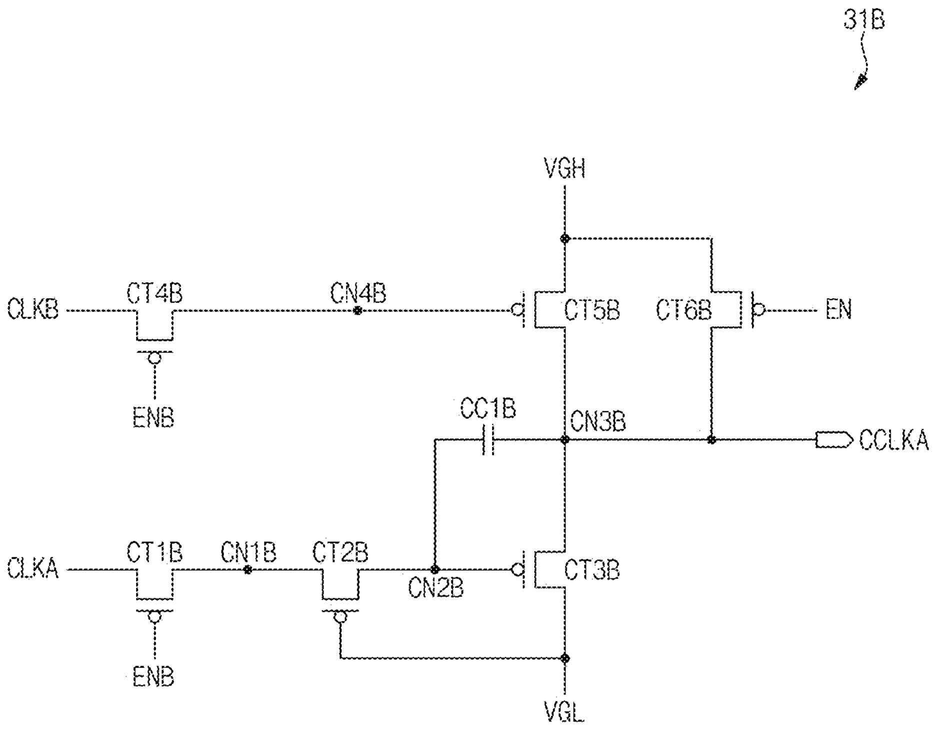
FIG. 9 is a circuit diagram illustrating another example of a clock signal compensator of FIG. 6.

FIG. 9 is a circuit diagram illustrating another example of a clock signal compensator 310A of FIG. 6.

Referring to FIG. 1 to FIG. 7 and FIG. 9, the clock signal compensator 31B may include first to sixth CT1B, CT2B, CT3B, CT4B, CT5B and CT6B and a first capacitor CC1B.

The first transistor CT1B may include a control electrode for receiving the inverted enable signal ENB, a first electrode for receiving the first clock signal CLKA and a second electrode connected to a first node CN1B. The first transistor CT1B may apply the first clock signal CLKA to the first node CN1B in response to the inverted enable signal ENB.

The second transistor CT2B may include a control electrode for receiving the low power voltage VGL, a first electrode connected to the first node CN1B and a second electrode connected to the second node CN2B. The second transistor CT2B may connect the first node CN1B and the second node CN2B.

The third transistor CT3B may include a control electrode connected to the second node CN2B, a first electrode for receiving the low power voltage VGL and a second electrode connected to the third node CN3B. The third transistor CT3B may apply the low power voltage VGL to the third node CN3B in response to a voltage of the second node CN2B.

The fourth transistor CT4B may include a control electrode for receiving the inverted enable signal ENB, a first electrode for receiving the second clock signal CLKB and a second electrode connected to the fourth node CN4B. The fourth transistor CT4B may apply the second clock signal CLKB to the fourth node CN4B in response to the inverted enable signal ENB.

The fifth transistor CT5B may include a control electrode connected to the fourth node CN4B, a first electrode for receiving the high power voltage VGH and a second electrode connected to the third node CN3B. The fifth transistor CT5B may apply the high power voltage VGH to the third node CN3B in response to a voltage of the fourth node CN4B.

The sixth transistor CT6B may include a control electrode for receiving the enable signal EN, a first electrode for receiving the high power voltage VGH and a second electrode connected to the third node CN3B. The sixth transistor CT6B may apply the high power voltage VGH to the third node CN3B in response to the enable signal EN.

The first capacitor CC1B may include a first electrode connected to the second node CN2B and a second electrode connected to the third node CN3B.

In the present embodiment, the clock signal compensator 31B may output the first compensation clock signal CCLKA. The third node CN3B of the clock signal compensator 31B may output the first compensation clock signal CCLKA.

In the first period PT1A, the inverted enable signal ENB may have the logic low level, so that the first transistor CT1B may be turned on. Accordingly, the first clock signal CLKA may be applied to the first node CN1B. The first clock signal CLKA may be applied to the first node CN1B, so that the first compensation clock signal CCLKA may have substantially same timing with the first clock signal CLKA.

In the second period PT2A, the inverted enable signal ENB may have the logic high level, so that the first transistor CT1B and the fourth transistor CT4B may be turned off. Accordingly, the first clock signal CLKA may not be applied to the first node CN1B. In the second period PT2A, the first clock signal CLKA may not be applied to the first node CN1B, so that the first compensation clock signal CCLKA may have a clock high level. For example, the first compensation clock signal CCLKA may be maintained as clock high level. Additionally, in the second period PT2A, the enable signal EN may have the logic low level, so that the sixth transistor CT6B may be turned on. The sixth transistor CT6B may be turned on, the high power voltage VGH may be applied to the third node CN3B. Accordingly, the first compensation clock signal CCLKA may be stably outputted as a clock high level.

In the present embodiment, the first compensation clock signal CCLKA may be outputted based on the inverted enable signal ENB. Additionally, some stages of the gate driver 3000 may receive the first compensation clock signal CCLK, so that the first compensation clock signal CCLKA may have substantially same timing with the first clock signal CLKA. Accordingly, timings applied to the clock signals applied to stages of the gate driver 300 may be substantially same. The timings applied to the clock signals applied to stages of the gate driver 300 may be substantially same, so that the gate signals generated from the gate driver 300 may be improved. Accordingly, a display quality of the display panel 100 may be effectively improved.

Additionally, the first compensation clock signal CCLKA may keep the clock high level based on the inverted enable signal ENB. Accordingly, a power consumption of the display device 1 may be effectively reduced.

Figure 10:
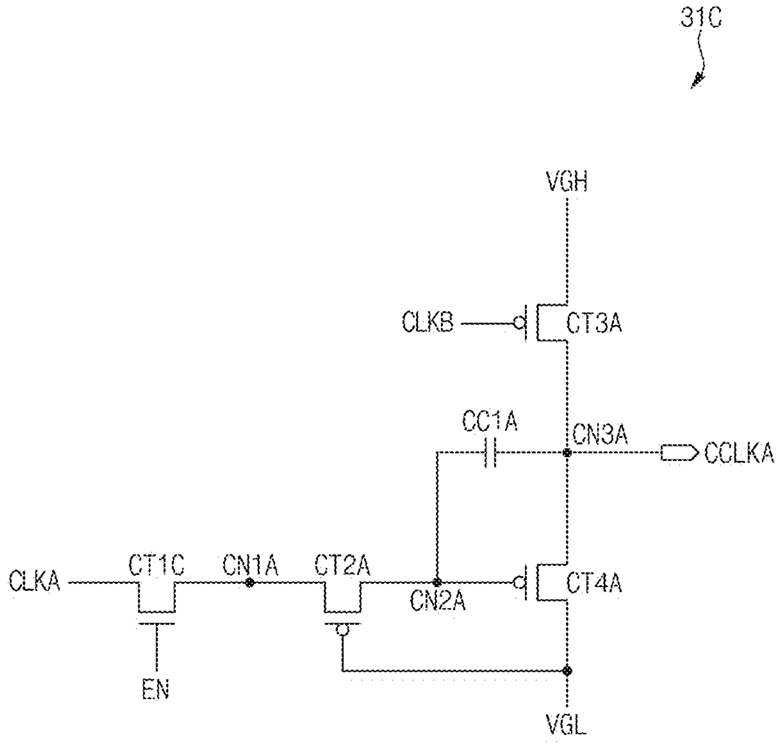
FIG. 10 is a circuit diagram illustrating still another example of a clock signal compensator of FIG. 6.

FIG. 10 is a circuit diagram illustrating still another example of a clock signal compensator 310A of FIG. 6.

Referring to FIG. 1 to FIG. 7 and FIG. 10, the clock signal compensator 31C may include first to fourth CT1C, CT2A, CT3A and CT4A and a first capacitor CC1A.

The clock signal compensator 31C of FIG. 10 is substantially same as the clock signal compensator 31A of FIG. 8 except that the first transistor CT1C is an N-type transistor, and the first transistor CT1C receives the enable signal EN rather than the inverted enable signal ENB, so that the same reference numerals will be used and any repetitive explanation concerning the above elements will be omitted.

In the present embodiment, the first transistor CT1C may include a control electrode for receiving the enable signal EN, a first electrode for receiving the first clock signal CLKA and a second electrode connected to the first node CN1A. The first transistor CT1C may apply the first clock signal CLKA to the first node CN1A in response to the enable signal EN.

In the present embodiment, the first transistor CT1C may be an N-type transistor. The second to fourth transistors CT2A, CT3A and CT4A may be P-type transistors.

Figure 11:
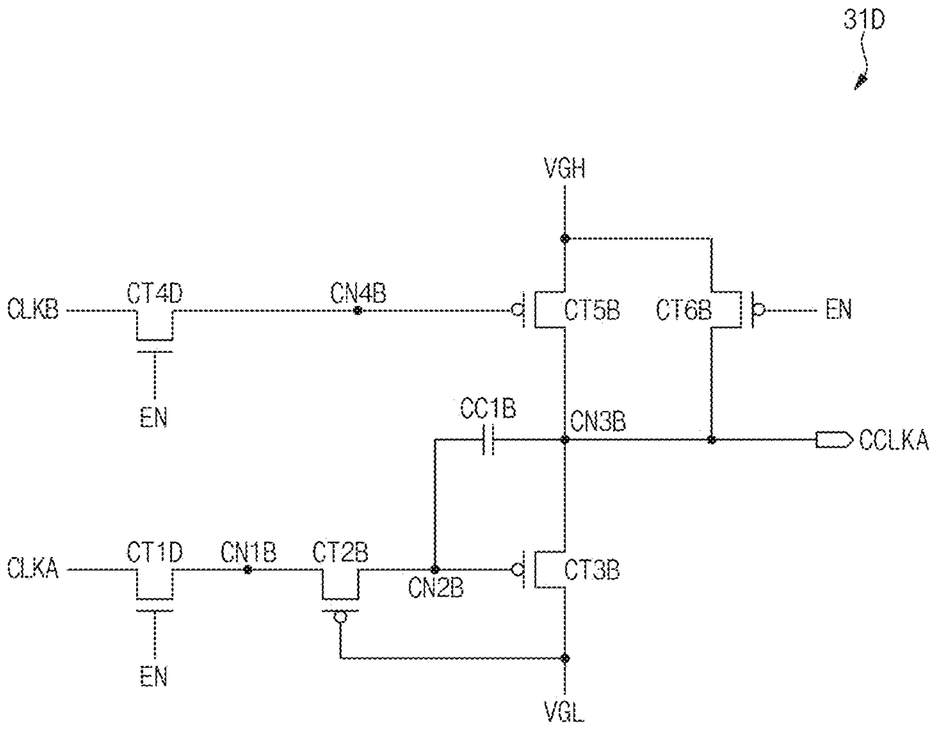
FIG. 11 is a circuit diagram illustrating yet another example of a clock signal compensator of FIG. 6.

FIG. 11 is a circuit diagram illustrating yet another example of a clock signal compensator 310A of FIG. 6.

Referring to FIG. 1 to FIG. 7 and FIG. 11, the clock signal compensator 31D may include first to sixth CT1D, CT2B, CT3B, CT4D, CT5B and CT6B and a first capacitor CC1B.

The clock signal compensator 31D of FIG. 10 is substantially same as the clock signal compensator 31B of FIG. 9 except that the first transistor CT1D is an N-type transistor, the fourth transistor CT4D is an N-type transistor, the first transistor CT1D receives the enable signal EN rather than the inverted enable signal ENB, and the fourth transistor CT4D receives the enable signal EN rather than the inverted enable signal ENB, so that the same reference numerals will be used and any repetitive explanation concerning the above elements will be omitted.

In the present embodiment, the first transistor CT1D and the fourth transistor CT4D may be N-type transistors. The second transistor CT2B, the third transistor CT3B, the fifth transistor CT5B and the sixth transistor CT6B may be P-type transistors.

In the present embodiment, the first transistor CT1D may include a control electrode for receiving the enable signal EN, a first electrode for receiving the first clock signal CLKA and a second electrode connected to the first node CN1B. The first transistor CT1D may apply the first clock signal CLKA to the first node CN1B in response to the enable signal EN.

The fourth transistor CT4D may include a control electrode for receiving the enable signal EN, a first electrode for receiving the second clock signal CLKB and a second electrode connected to the fourth node CN4B. The fourth transistor CT4D may apply the second clock signal CLKB to the fourth node CN4B in response to the enable signal EN.

In the present embodiment, the first transistor CT1D and the fourth transistor CT4D may receive the enable signal EN rather than the inverted enable signal ENB. Accordingly, the clock signal compensator 31D may not receive the inverted enable signal ENB. The clock signal compensator 31D may not receive the inverted enable signal ENB, so that the display device 1 may not include lines for outputting the inverted enable signal ENB. Accordingly, an integration of the gate driver 300 may be improved.

Figure 12:
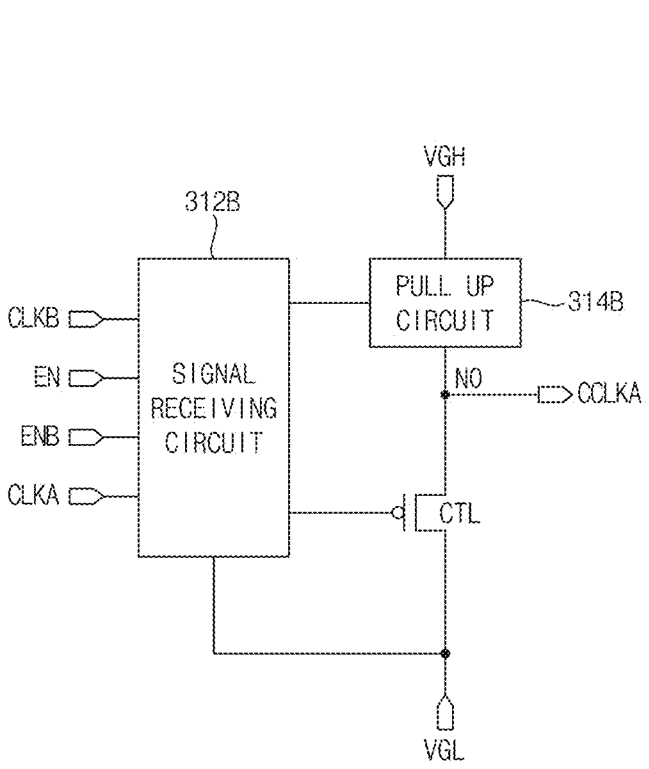
FIG. 12 is a circuit diagram illustrating another example of a clock signal compensator included in a gate driver of FIG. 1.
Figure 13:
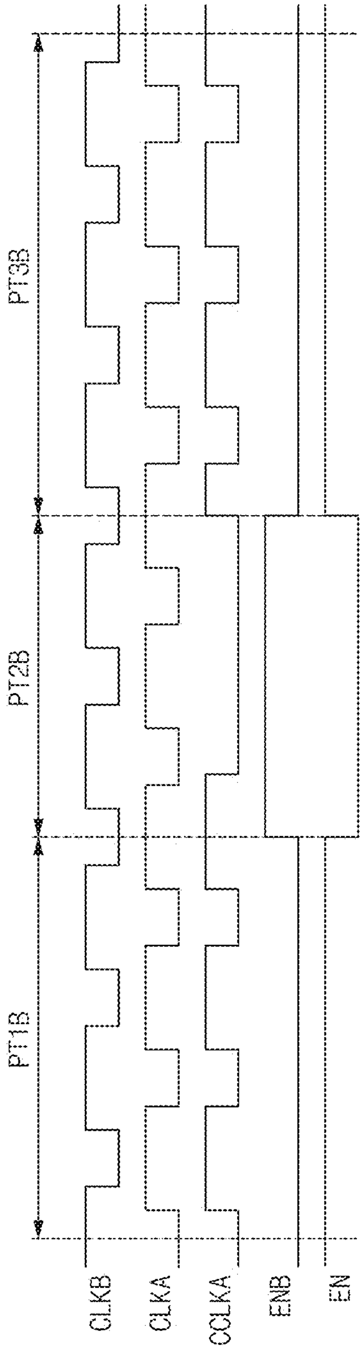
FIG. 13 is a timing diagram illustrating an example of input signals and an output signal of a clock signal compensator of FIG. 12.

FIG. 12 is a circuit diagram illustrating another example of a clock signal compensator 310 included in a gate driver 300 of FIG. 1. FIG. 13 is a timing diagram illustrating an example of input signals and an output signal of a clock signal compensator 310B of FIG. 12.

Referring to FIG. 1 to FIG. 5, FIG. 12 and FIG. 13, the clock signal compensator 310B may include a signal receiving circuit 312B, a pull up circuit 314B and a pull down transistor CTL. The clock control signal CCS may include an enable signal EN and an inverted enable signal ENB.

The signal receiving circuit 312B may receive the first clock signal CLKA, the second clock signal CLKB, the enable signal EN and the inverted enable signal ENB. The signal receiving circuit 312B may generate a pull up control signal and a pull down control signal based on the first clock signal CLKA, the second clock signal CLKB, the enable signal EN and the inverted enable signal ENB. The signal receiving circuit 312B may output the pull up control signal to the pull up circuit 314B. The signal receiving circuit 312B may output the pull down control signal to the pull down transistor CTL.

The pull up circuit 314B may output the high power voltage VGH to an output node NO in response to the pull up control signal. The pull down transistor CTL may output the low power voltage VGL to the output node NO in response to the pull down control signal. The output node NO may output the first compensation clock signal CCLKA.

In the present embodiment, a period in which the clock signals CLKA, CLKB and CCLKA is outputted may include a first period PT1B, a second period PT2B and a third period PT3B.

In the first period PT1B, the enable signal EN may have a logic high level, and the inverted enable signal ENB may have a logic low level. In the first period PT1B, the first compensation clock signal CCLKA may have substantially same timing with the first clock signal CLKA.

In the second period PT2B following to the first period PT1B, the enable signal EN may have a logic low level, and the inverted enable signal ENB may have a logic high level. In the second period PT2A, the first compensation clock signal CCLKA may have DC voltage based on the clock control signal CCS. For example, when the enable signal EN may have a logic low level, and the inverted enable signal ENB may have a logic high level, the first compensation clock signal CCLKA may have DC voltage. For example, in the second period PT2B, the first compensation clock signal CCLKA may be maintained as a clock high level.

In the present embodiment, the first compensation clock signal CCLKA may have DC voltage based on the clock control signal CCS, the compensation stages (e.g., stages after the K−1-th stage) may receive the first compensation clock signal CCLKA having DC voltage. Accordingly, a power consumption of the display device 1 may be reduced. Additionally, the compensation stages (e.g., STAGE K and after) may be initialized as the DC voltage. Accordingly, a driving reliability of the gate driver 300 may be effectively improved. For example, the compensation stages may not generate the gate signals. The compensation stages may not generate the gate signals, so that a power consumption of the display device 1 may be further reduced.

The third period PT3B following to the second period PT2B, the enable signal EN may have a logic high level, and the inverted enable signal ENB may have a logic low level.

In the third period PT3B, the first compensation clock signal CCLKA may have substantially same timing with the first clock signal CLKA.

Figure 14:
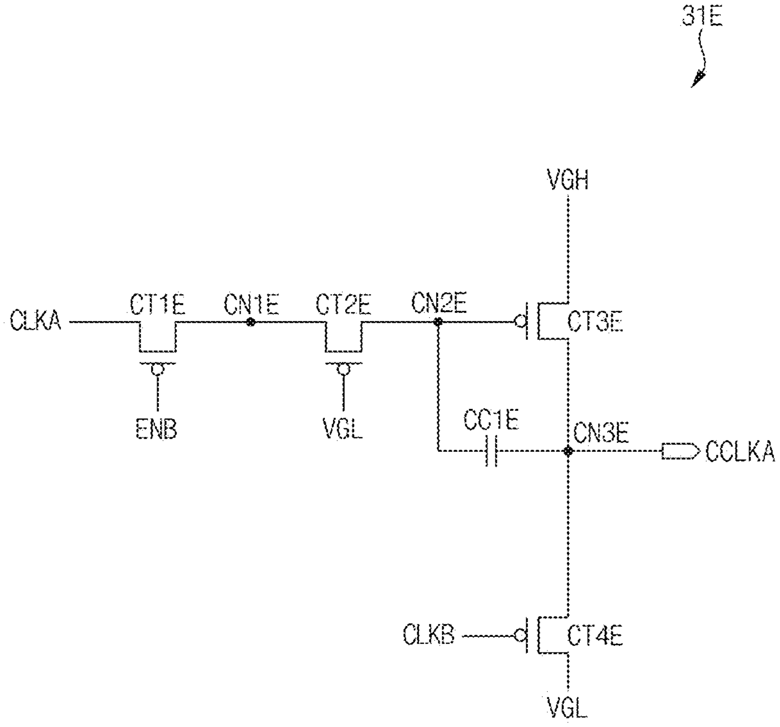
FIG. 14 is a circuit diagram illustrating an example of a clock signal compensator of FIG. 12.

FIG. 14 is a circuit diagram illustrating an example of a clock signal compensator 310B of FIG. 12.

Referring to FIG. 1 to FIG. 5 and FIG. 12 to FIG. 14, the clock signal compensator 31E may include first to fourth CT1E, CT2E, CT3E and CT4E and a first capacitor CC1E.

The first transistor CT1E may include a control electrode for receiving the inverted enable signal ENB, a first electrode for receiving the first clock signal CLKA and a second electrode connected to a first node CN1E. The first transistor CT1E may apply the first clock signal CLKA to the first node CN1E in response to the inverted enable signal ENB.

The second transistor CT2E may include a control electrode for receiving the low power voltage VGL, a first electrode connected to the first node CN1E and a second electrode connected to the second node CN2E. The second transistor CT2E may connect the first node CN1E and the second node CN2E.

The third transistor CT3E may include a control electrode connected to the second node CN2E, a first electrode for receiving the high power voltage VGH and a second electrode connected to the third node CN3E. The third transistor CT3E may apply the high power voltage VGH to the third node CN3E in response to a voltage of the second node CN2E.

The fourth transistor CT4E may include a control electrode for receiving the second clock signal CLKB, a first electrode for receiving the low power voltage VGL and a second electrode connected to the third node CN3E. The fourth transistor CT4E may apply the low power voltage VGL to the third node CN3E in response to the second clock signal CLKB.

The first capacitor CC1E may include a first electrode connected to the second node CN2E and a second electrode connected to the third node CN3E.

In the present embodiment, the clock signal compensator 31E may output the first compensation clock signal CCLKA. The third node CN3E of the clock signal compensator 31E may output the first compensation clock signal CCLKA.

In the first period PT1B, the inverted enable signal ENB may have the logic low level, so that the first transistor CT1E may be turned on. Accordingly, the first clock signal CLKA may be applied to the first node CN1E. The first clock signal CLKA may be applied to the first node CN1E, so that the first compensation clock signal CCLKA may have substantially same timing with the first clock signal CLKA.

In the second period PT2B, the inverted enable signal ENB may have the logic high level, so that the first transistor CT1E may be turned off. Accordingly, the first clock signal CLKA may not be applied to the first node CN1E. In the second period PT2B, the first clock signal CLKA may not be applied to the first node CN1E, so that the first compensation clock signal CCLKA may have a clock low level. For example, the first compensation clock signal CCLKA may be maintained as clock low level.

In the present embodiment, the first compensation clock signal CCLKA may be outputted based on the inverted enable signal ENB. Additionally, some stages of the gate driver 3000 may receive the first compensation clock signal CCLK, so that the first compensation clock signal CCLKA may have substantially same timing with the first clock signal CLKA. Accordingly, timings applied to the clock signals applied to stages of the gate driver 300 may be substantially same. The timings applied to the clock signals applied to stages of the gate driver 300 may be substantially same, so that the gate signals generated from the gate driver 300 may be improved. Accordingly, a display quality of the display panel 100 may be effectively improved.

Additionally, the first compensation clock signal CCLKA may have the clock low level based on the inverted enable signal ENB. Accordingly, a power consumption of the display device 1 may be effectively reduced.

Figure 15:
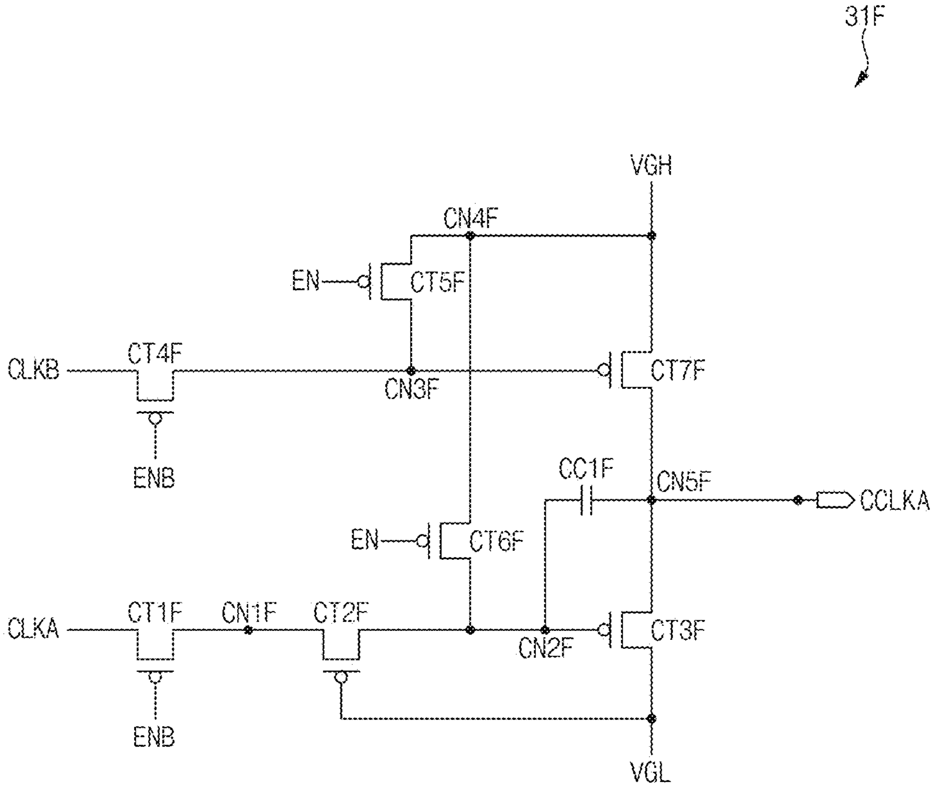
FIG. 15 is a circuit diagram illustrating an example of a clock signal compensator included in a gate driver of FIG. 1.

FIG. 15 is a circuit diagram illustrating an example of a clock signal compensator included in a gate driver 300 of FIG. 1.

Referring to FIG. 1 and FIG. 15, the clock signal compensator 31F may include first to seventh CT1F, CT2F, CT3F, CT4F, CT5F, CT6F and CT7F and a first capacitor CC1F.

The first transistor CT1F may include a control electrode for receiving the inverted enable signal ENB, a first electrode for receiving the first clock signal CLKA and a second electrode connected to a first node CN1F. The first transistor CT1F may apply the first clock signal CLKA to the first node CN1F in response to the inverted enable signal ENB.

The second transistor CT2F may include a control electrode for receiving the low power voltage VGL, a first electrode connected to the first node CN1F and a second electrode connected to the second node CN2F.

The third transistor CT3F may include a control electrode connected to the second node CN2F, a first electrode for receiving the low power voltage VGL and a second electrode connected to the fifth node CN5F. The third transistor CT3F may apply the low power voltage VGL to the fifth node CN5F in response to a voltage of the second node CN2F.

The fourth transistor CT4F may include a control electrode for receiving the inverted enable signal ENB, a first electrode for receiving the second clock signal CLKB and a second electrode connected to the third node CN3F. The fourth transistor CT4F may apply the second clock signal CLKB to the third node CN3F in response to the inverted enable signal ENB.

The fifth transistor CT5F may include a control electrode for receiving the enable signal EN, a first electrode connected to the fourth node CN4F and a second electrode connected to the third node CN3F. The high power voltage VGH may be applied to the fourth node CN4F. The fifth transistor CT5F may apply the high power voltage VGH to the third node CN3F in response the enable signal EN.

The sixth transistor CT6F may include a control electrode for receiving the enable signal EN, a first electrode connected to the fourth node CN4F and a second electrode connected to the second node CN2F. The sixth transistor CT6F may apply the high power voltage VGH to the second node CN2F in response to the enable signal EN.

The seventh transistor CT7F may include a control electrode connected to the third node CN3F, a first electrode for receiving the high power voltage VGH and a second electrode connected to the fifth node CN5F. The fifth transistor CT5B may apply the high power voltage VGH to the fifth node CN5F in response to a voltage of the third node CN3F. The fifth node CN5F may output the first compensation clock signal CCLKA.

The first capacitor CC1F may include a first electrode connected to the fifth node CN1F and a second electrode connected to the second node CN2F. The first capacitor CC1F may couple a voltage change of the second node CN2F and apply to the fifth node CN5F.

When the enable signal EN has an activation level, the fifth transistor CT5F and the sixth transistor CT6FF may be turned on. The fifth transistor CT5F may be turned on, so that the high power voltage VGH may be applied to the third node CN3F. Accordingly, the seventh transistor CT7F may be turned off. The sixth transistor CT6F may be turned off, so that the high power voltage VGH may be applied to the second node CN2F. The high power voltage VGH may be applied to the second node CN2F, so that the third transistor CT3F may be turned off. Additionally, the first capacitor CC1F may couple a voltage of the second node CN2F and apply to the fifth node CN5F. Accordingly, the first compensation clock signal CCLKA may have a clock high level. For example, the first compensation clock signal CCLKA may have a coupling high voltage. The coupling high voltage may be higher than the high power voltage VGH.

Figure 16:
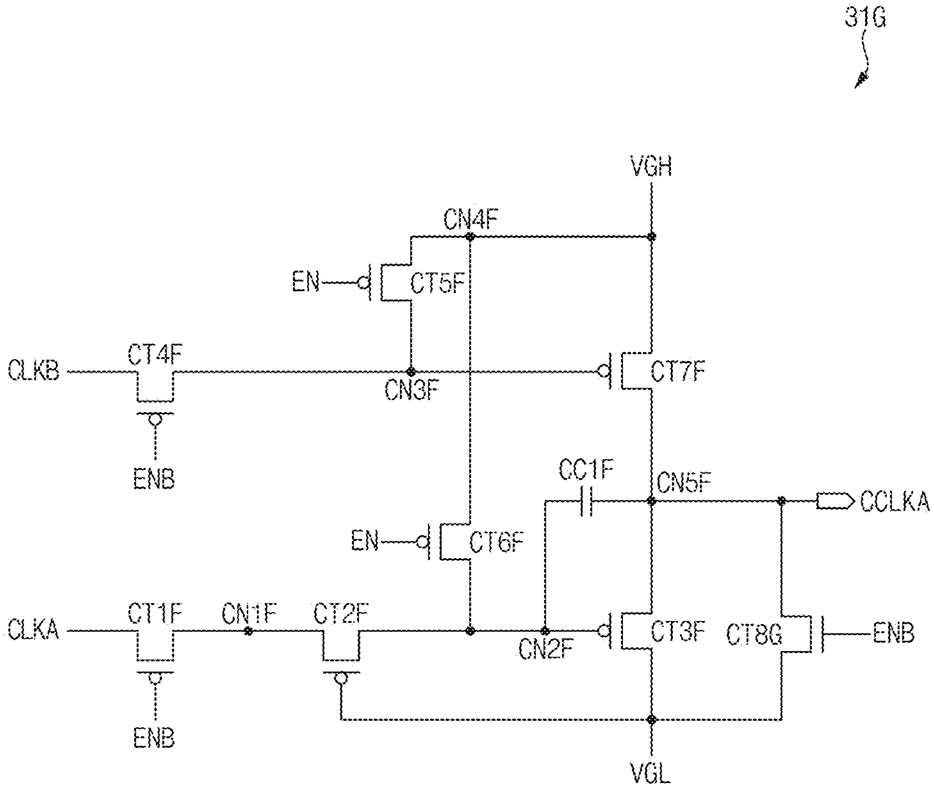
FIG. 16 is a circuit diagram illustrating an example of a clock signal compensator included in a gate driver of FIG. 1.

FIG. 16 is a circuit diagram illustrating an example of a clock signal compensator included in a gate driver 300 of FIG. 1.

A clock signal compensator 31G of FIG. 16 is substantially same as the clock signal compensator 31F of FIG. 15 except that the clock signal compensator 31G further includes an eighth transistor CT8G, so that the same reference numerals will be used and any repetitive explanation concerning the above elements will be omitted.

The clock signal compensator 31G may include first to eighth CT1F, CT2F, CT3F, CT4F, CT5F, CT6F, CT7F and CT8G and a first capacitor CC1F.

The eighth transistor CT8G may include a control electrode for receiving the inverted enable signal ENB, a first electrode for receiving the low power voltage VGL and a second electrode connected to the fifth node CN5F. The eighth transistor CT8G may apply the low power voltage VGL to the fifth node CN5F in response to the inverted enable signal ENB. In the present embodiment, the first to seventh transistors CT1F, CT2F, CT3F, CT4F, CT5F, CT6F and CT7F may be P-type transistors, and the eighth transistor CT8G may be an N-type transistor. When the enable signal has an activation level, the inverted enable signal ENB may have an inactivation level.

When the enable signal EN has an activation level, the fifth transistor CT5F and the sixth transistor CT6FF may be turned on. The fifth transistor CT5F may be turned on, so that the high power voltage VGH may be applied to the third node CN3F. Accordingly, the seventh transistor CT7F may be turned off. The sixth transistor CT6F may be turned off, so that the high power voltage VGH may be applied to the second node CN2F. The high power voltage VGH may be applied to the second node CN2F, so that the third transistor CT3F may be turned off. The eighth transistor CT8G may be turned on in response to a logic high level of the inverted enable signal ENB. Accordingly, the low power voltage VGL may be applied to the fifth node CN5F. Accordingly, the first compensation clock signal CCLKA may have a clock low level.

Figure 17:
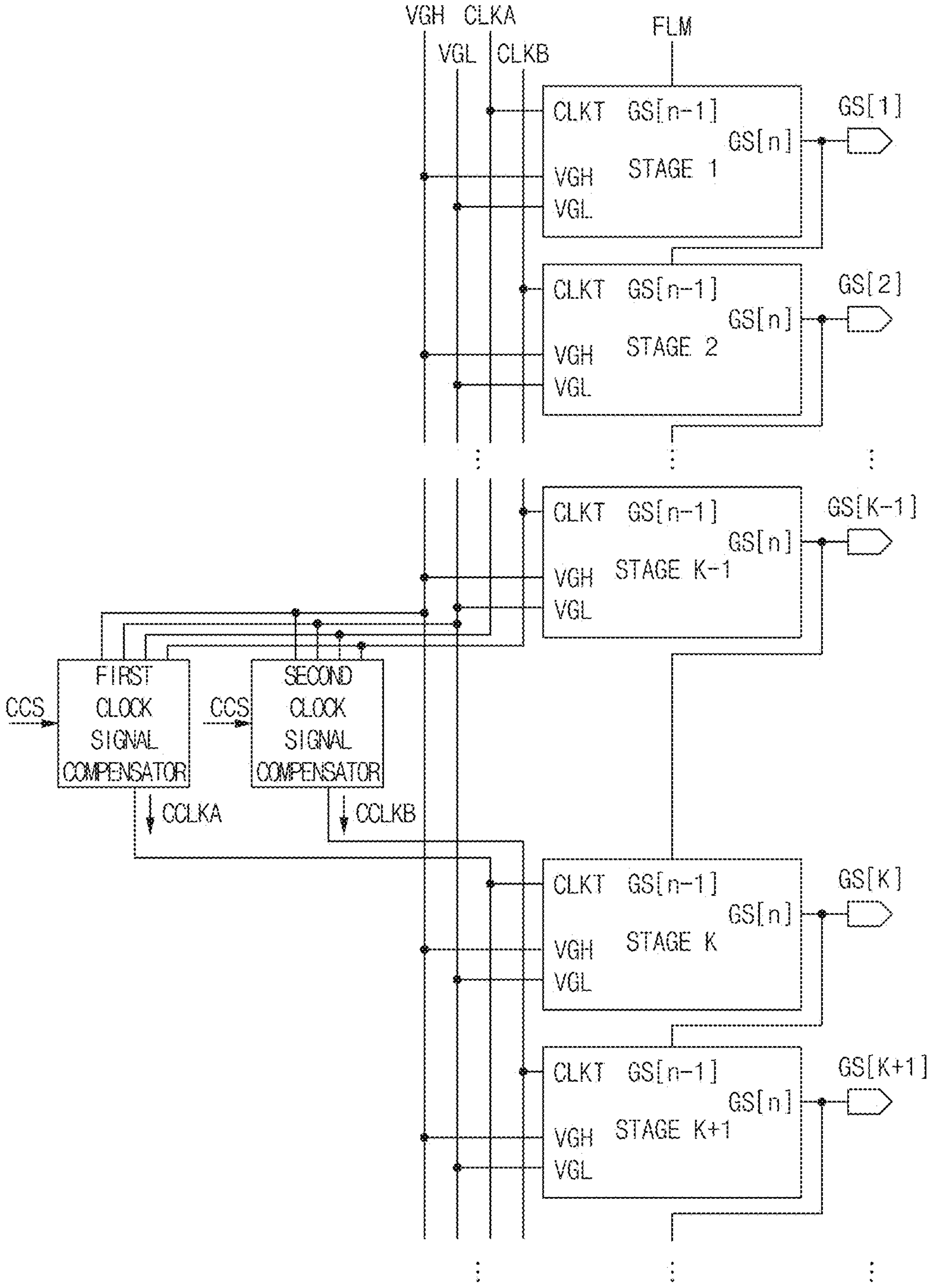
FIG. 17 is a block diagram illustrating still another example of a gate driver of FIG. 1.

FIG. 17 is a block diagram illustrating still another example of a gate driver 300 of FIG. 1.

Referring to FIG. 1 and FIG. 17, a gate driver 300C may include a plurality of stages STAGE1, STAGE2 to STAGE K−1, STAGE K, STAGE K+1 . . . which receive a vertical start signal FLM, a first gate clock signal CLKA and a second clock signal CLKB, and sequentially output the gate signals GS[1], GS[2], to GS[K−1], GS[K], GS[K+1] . . . to a plurality of pixels PX row-by-row. That is, the first gate signal GS[1] is provided to pixels in a first row, the second gate signal GS[2] is provided to pixels in a second row . . . and the K+1-th gate signal GS[K+1] is provided to pixels in a K+1-th row.

In the present embodiment, the gate driver 300C may further include a first clock signal compensator and a second clock signal compensator. The first clock signal compensator and the second clock signal compensator may receive a clock control signal CCS, a high power voltage VGH, a low power voltage VGL, the first clock signal CLKA and the second clock signal CLKB. The first clock signal compensator may generate a first compensation clock signal CCLKA based on the clock control signal CCS, the first clock signal CLKA and the second clock control signal CLKB. The second clock signal compensator may generate a second compensation clock signal CCLKB based on the clock control signal CCS, the first clock signal CLKA and the second clock control signal CLKB. The first clock signal compensator may output the first compensation clock signal CCLKA to the K-th stage STAGE K. The second clock signal compensator may output the second compensation clock signal CCLKB to the K+1-th stage STAGE K+1.

The first clock signal CLKA may be applied to a clock terminal CLKT of the first stage STAGE 1. The second clock signal CLKB may be applied to a clock terminal CLKT of the second stage STAGE 2. The second clock signal CLKB may be applied to a clock terminal CLKT of the K−1-th stage STAGE K−1.

In the present embodiment, the K-th stage STAGE K may receive the first compensation clock signal CCLK rather than the first clock signal CLKA. Additionally, the K+1-th stage STAGE K+1 may receive the second compensation clock signal CCLKB rather than the second clock signal CLKB.

In a conventional gate driver, a reliability of a clock signal may be reduced by the length of a clock line to which the clock signal is applied. For example, the reliability of the waveform of the clock signal may be reduced by resistance, capacitance, etc. according to the length of the clock line. Accordingly, the reliability of a gate signal may be reduced.

In contrast, in the present embodiment, the K-th stage STAGE K may receive the first compensation clock signal CCLK rather than the first clock signal CLKA, so that a reliability of a clock signal applied to the K-th stage STAGE K may be improved. For example, the first stage STAGE 1 may generate a first gate signal GS[1] based on the first clock signal CLKA. The K-th stage STAGE K may generate a K-th gate signal GS[K] based on the first compensation clock signal CCLKA. An output characteristics (e.g., rising characteristics, falling characteristics, delay characteristics, etc.) of the K-th gate signal GS[K] may be substantially the same as an output characteristics of the first gate signal GS[1]. Accordingly, an output reliability and an output stability of the gate signals outputted from the gate driver 300A may be improved. Accordingly, a display quality of the display panel 100 may be improved.

Additionally, the K+1-th stage STAGE K+1 may receive the second compensation clock signal CCLKB rather than the second clock signal CLKB, so that the reliability of a clock signal applied to the K+1-th stage STAGE K+1 may be improved. Accordingly, a reliability of a K+1-th gate signal GS[K+1] outputted from the K+1-th stage STAGE K+1 may be improved. Accordingly, an output reliability and an output stability of the gate signals outputted from the gate driver 300A may be further improved. Accordingly, a display quality of the display panel 100 may be further improved.

Figure 18:
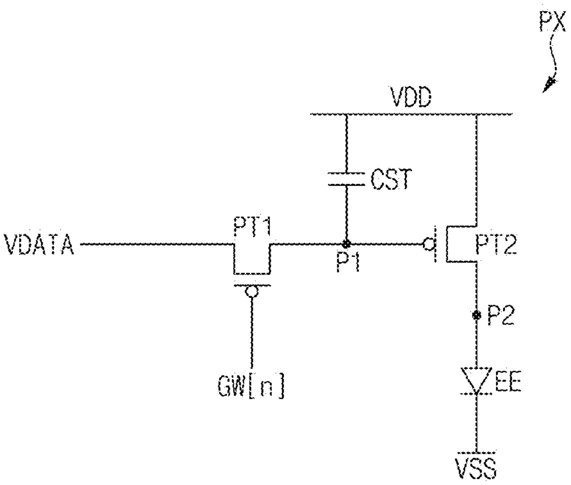
FIG. 18 is a circuit diagram illustrating an example of a pixel of FIG. 1.

FIG. 18 is a circuit diagram illustrating an example of a pixel PX of FIG. 1.

Referring to FIG. 1 and FIG. 18, the pixel PX may include a first pixel transistor PT1, a second pixel transistor PT2, a storage capacitor CST and a light emitting element EE.

The first pixel transistor PT1 may include a control electrode for receiving a write gate signal GW[n], a first electrode for receiving the data voltage VDATA and a second electrode connected to a first pixel node P1. The first pixel transistor PT1 may apply the data voltage VDATA to the first pixel node P1 in response to the write gate signal GW[n]. For example, the first pixel transistor PT1 may be called as a write transistor.

The second pixel transistor PT2 may include a control electrode connected to the first pixel node P1, a first electrode for receiving a first power voltage VDD and a second electrode connected to the second pixel node P2. The second pixel transistor PT2 may generate a driving current based on a voltage of the first pixel node P1. For example, the second pixel transistor PT2 may be called as a driving transistor.

The storage capacitor CST may include a first electrode for receiving the first power voltage VDD and a second electrode connected to the first pixel node P1. The storage capacitor CST may store the voltage of the first pixel node P1.

The light emitting element EE may include a first electrode connected to the second pixel node P2 and a second electrode for receiving a second power voltage VSS. The light emitting element EE may emit light based on the driving current.

The pixel PX may emit light based on the data voltage VDATA. However, the present invention is not limited to a structure of the pixel PX.

Figure 20:
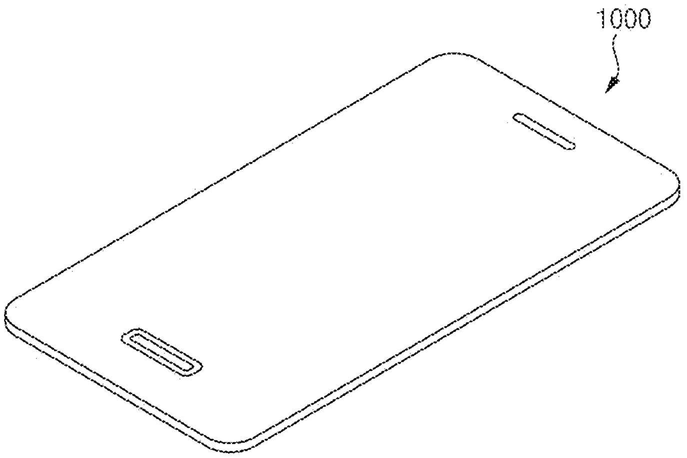
FIG. 20 is a diagram illustrating an example in which the electronic apparatus of FIG. 19 is implemented as a smart phone.

FIG. 19 is a block diagram illustrating an electronic apparatus 1000 according to an embodiment of the present invention. FIG. 20 is a diagram illustrating an example in which the electronic apparatus of FIG. 19 is implemented as a smart phone.

Referring to FIG. 19, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. Additionally, the electronic apparatus 1000 may further include a plurality of ports for communicating with a video card, a sound card, a memory card, a universal serial bus (USB) device, other electronic apparatus, etc.

In an embodiment, as illustrated in FIG. 20, the electronic apparatus 1000 may be implemented as a smart phone. However, the electronic apparatus 1000 is not limited thereto.

For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG, the app-on signal APPON and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Referring to FIG. 20, the electronic apparatus of the present invention is shown implemented as a smartphone, but the present invention is not limited thereto. The electronic apparatus may be a television, a monitor, a laptop computer, or a tablet. Additionally, the electronic apparatus may be a car.

The display apparatus according to the embodiments may be applied to a display apparatus included in a computer, a notebook, a mobile phone, a smart phone, a smart pad, a PMP, a PDA, an MP3 player, or the like.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A display device comprising:

a display panel including a plurality of pixels;

a gate driver configured to output a gate signal to the pixels;

a data driver configured to apply a data voltage to the pixels; and a driving controller configured to control the gate driver and the data driver, wherein the gate driver includes a first stage, a second stage and a clock signal compensator, wherein the first stage generates a first gate signal based on a first clock signal and optionally a second clock signal, wherein the clock signal compensator generates a compensation clock signal based on the first clock signal, the second clock signal and a clock control signal, and wherein the second stage generates a second gate signal based on the compensation clock signal and optionally the second clock signal.

2. The display device of claim 1, wherein the clock signal compensator includes:

a first transistor configured to apply the first clock signal to a first node in response to the clock control signal;

a second transistor configured to connect the first node and a second node;

a third transistor configured to apply a high power voltage to a third node in response to the second clock signal; and a fourth transistor configured to apply a low power voltage lower than the high power voltage to the third node in response to a voltage of the second node, and wherein the third node outputs the compensation clock signal.

3. The display device of claim 2, wherein the first transistor is an N-type transistor, and the second transistor, the third transistor and the fourth transistor are P-type transistors.

4. The display device of claim 2, wherein when the clock control signal has an inactivation level, the first transistor is turned off, and the compensation clock signal maintain as a clock high level.

5. The display device of claim 2, wherein the first transistor includes a control electrode, which receives the clock control signal, a first electrode, which receives the first clock signal and a second electrode connected to the first node, wherein the second transistor includes a control electrode, which receives the low power voltage, a first electrode connected to the first node and a second electrode connected to the second node, wherein the third transistor includes a control electrode, which receives the second clock signal, a first electrode, which receives the high power voltage and a second electrode connected to the third node, and wherein the fourth transistor includes a control electrode connected to the second node, a first electrode, which receives the low power voltage and a second electrode connected to the third node.

6. The display device of claim 1, wherein the clock control signal includes an enable signal and an inverted enable signal which has inverted phase from the enable signal, wherein the clock signal compensator includes:

a first transistor configured to apply the first clock signal to a first node in response to the inverted enable signal;

a second transistor configured to connect the first node and a second node;

a third transistor configured to apply a low power voltage to a third node in response to a voltage of the second node;

a fourth transistor configured to apply the second clock signal to a fourth node in response to the inverted enable signal;

a fifth transistor configured to apply a high power voltage higher than the low power voltage to the third node in response to a voltage of the fourth node; and a sixth transistor configured to apply the high power voltage to the third node in response to the enable signal, and wherein the third node outputs the compensation clock signal.

7. The display device of claim 6, wherein when the enable signal has an activation level, the sixth transistor is turned on, and the compensation clock signal maintain as a clock high level.

8. The display device of claim 7, wherein when the enable signal has the logic low level, the first transistor is turned off.

9. The display device of claim 6, wherein the first transistor includes a control electrode, which receives the inverted enable signal, a first electrode, which receives the first clock signal and a second electrode connected to the first node, wherein the second transistor includes a control electrode, which receives the low power voltage, a first electrode connected to the first node and a second electrode connected to the second node, wherein the third transistor includes a control electrode connected to the second node, a first electrode, which receives the low power voltage and a second electrode connected to the third node, wherein the fourth transistor includes a control electrode, which receives the inverted enable signal, a first electrode, which receives the second clock signal and a second electrode connected to the fourth node, wherein the fifth transistor includes a control electrode connected to a fourth node, a first electrode, which receives the high power voltage and a second electrode connected to the third node, and wherein the sixth transistor includes a control electrode, which receives the enable signal, a first electrode, which receives the high power voltage and a second electrode connected to the third node.

10. The display device of claim 1, wherein the clock control signal includes an enable signal, wherein the clock signal compensator includes:

a first transistor configured to apply the first clock signal to a first node in response to the enable signal;

a second transistor configured to connect the first node and a second node;

a third transistor configured to apply a low power voltage to a third node in response to a voltage of the second node;

a fourth transistor configured to apply the second clock signal to a fourth node in response to the enable signal;

a fifth transistor configured to apply a high power voltage higher than the low power voltage to a third node in response to a voltage of the fourth node; and a sixth transistor configured to apply the high power voltage to the third node in response to the enable signal, and wherein the third node outputs the compensation clock signal.

11. The display device of claim 10, wherein the first transistor and the fourth transistor are N-type transistors, and wherein the second transistor, the third transistor, the fifth transistor and the sixth transistor are P-type transistors.

12. The display device of claim 11, wherein when the enable signal has a logic high level, the first transistor is turned on, the fourth transistor is turned on, and the sixth transistor is turned off.

13. The display device of claim 12, wherein when the enable signal has a logic low level, the first transistor is turned off, the fourth transistor is turned off, and the sixth transistor is turned on.

14. The display device of claim 13, wherein when the enable signal has a logic low level, the compensation clock signal has a clock high level.

15. The display device of claim 1, wherein the clock signal compensator includes:

a first transistor configured to apply the first clock signal to a first node in response to the clock control signal;

a second transistor configured to connect the first node and a second node;

a third transistor configured to apply a high power voltage to a third node in response to a voltage of the second node; and a fourth transistor configured to apply a low power voltage lower than the high power voltage to the third node in response to the second clock signal, and wherein the third node outputs the compensation clock signal.

16. The display device of claim 15, wherein when the clock control signal has an inactivation level, the compensation clock signal has a clock low level.

17. The display device of claim 16, wherein when the clock control signal has an inactivation level, the compensation clock signal has a DC voltage.

18. A gate driver comprising:

a first stage configured to generate a first gate signal based on a first clock signal and optionally a second clock signal;

a clock signal compensator configured to generate a compensation clock signal based on the first clock signal, the second clock signal and a clock control signal; and a second stage configured to generate a second gate signal based on the compensation clock signal and optionally the second clock signal.

19. The gate driver of claim 18, wherein the clock signal compensator includes:

a first transistor configured to apply the first clock signal to a first node in response to the clock control signal;

a second transistor configured to connect the first node and a second node;

a third transistor configured to apply a high power voltage to a third node in response to the second clock signal; and a fourth transistor configured to apply a low power voltage lower than the high power voltage to the third node in response to a voltage of the second node, and wherein the third node outputs the compensation clock signal.

20. An electronic device comprising:

a display panel including a plurality of pixels;

a gate driver configured to output a gate signal to the pixels;

a data driver configured to apply a data voltage to the pixels;

a driving controller configured to control the gate driver and the data driver based on an input control signal; and a processor configured to output the input control signal, wherein the gate driver includes a first stage, a second stage and a clock signal compensator, wherein the first stage generates a first gate signal based on a first clock signal and optionally a second clock signal, wherein the clock signal compensator generates a compensation clock signal based on the first clock signal, the second clock signal and a clock control signal, and wherein the second stage generates a second gate signal based on the compensation clock signal and optionally the second clock signal.

* * * * *